United States Patent [19]

Collins et al.

[11] Patent Number: 5,577,177
[45] Date of Patent: Nov. 19, 1996

[54] APPARATUS AND METHODS FOR CREATING AND USING PORTABLE FONTS

[75] Inventors: John S. Collins, Boston; Mark H. Goldwater, Norfolk, both of Mass.

[73] Assignee: Bitstream, Inc., Cambridge, Mass.

[21] Appl. No.: 448,792

[22] Filed: May 24, 1995

Related U.S. Application Data

[62] Division of Ser. No. 250,372, May 27, 1994.
[51] Int. Cl.$^6$ ........................................................ G06T 5/00
[52] U.S. Cl. ............................................. 395/169; 395/170
[58] Field of Search ................................... 395/150, 151, 395/155, 161, 141, 142, 143, 133

[56] References Cited

U.S. PATENT DOCUMENTS

| | | | |
|---|---|---|---|
| 4,785,391 | 11/1988 | Apley et al. | 364/518 |
| 5,099,435 | 3/1992 | Collins et al. | 395/150 |
| 5,309,554 | 5/1994 | Ito | 395/150 |
| 5,473,709 | 12/1995 | Aoki | 395/150 X |

OTHER PUBLICATIONS

*Ditital Formats for Typefaces*, by Peter Karow, Published by URW Verlag, Hamburg, Germany, 1987, Title page, Copright Notice Page, Table of Contents, and pp. 116–117 and pp. 376 and 377.

*Character Generation Under Grid Constraints*, by Roger Hersch, Computer Graphics, vol. 21, No. 4, Jul. 1987, pp. 243–252.

*Electronic Documents: A White Paper*, © 1993 by No Hands Software, 1301 Shoreway Road, Suite 220 Belmont, CA 94002.

*The Dawn of Easy Electronic Documents?*, © 1993 by Info World Publishing Company, vol. 9, Issue 14, pp. 4–8.

*Fonts and Output Issues*, The Seybold Report of Desktop Publishing, Apr. 8, 1991, pp. 27–30

(List continued on next page.)

*Primary Examiner*—Almis R. Jankus
*Attorney, Agent, or Firm*—Edward W. Porter

[57] ABSTRACT

A computerized apparatus and methods for character shape recording develops new font descriptions from shapes received from pre-defined descriptions. It does so by modeling each such shape to find features, such as points on its outlines, which are a function of that shape itself, rather than the manner in which the pre-defined description defined that shape. The system bases the segmentation of the new font description on such description-independent points. It finds new line or curve segments to approximate the pre-defined font description between such description-independent points, and it picks the outline order, starting points, and directions of that description according to standard rules. This causes the new font descriptions to be free of non-shape-required aspects of the pre-defined descriptions. It is also preferred that the system find how finely the curve must be subdivided on playback so it can be accurately portrayed with vectors by recursively subdividing the curve into subdivisions, approximating each subdivision by a vector, and recursing on the worst fitted subdivision until the worst fit is acceptable. Preferably the system matches outline shapes for different characters of the same or different fonts, and saves storage space by recording a single description of any shape used in more than one new font description. It is also preferred that the system generate new font descriptions from non-character shapes, such as logos. The invention can be used to create portable documents, by receiving fonted input text, accessing and interpreting the pre-defined font descriptions associated with each character-font shape in the input text, and generating a new font description for that shape. Such a system creates a portable document which includes the sequence of characters in the input text, the new font descriptions for those characters; and an indication of which of new font description represents the shape of each such character.

29 Claims, 14 Drawing Sheet

OTHER PUBLICATIONS

*Tools Review on Common Ground, Adobe Acrobat Exchange and Adobe Acrobat Starter Kit,* Publish magazine, Feb. 1994.

*Portable Documents,* InfoWorld, Jan. 17, 1994, pp. 66–67 and 71–77.

*Adobe™Acrobat™Products & Technology, An Overview,* by Adobe Systems Incorporated, 1585 Chareston Road, Mountain View, CA 94039, Nov. 1992.

Fontographer produce brochure, from Altsys Corporation, 269 Renner Road, Richardson, TX 75080.

Product review of Fontographer, MacUser magazine, Oct. 1992, p. 56.

Product review of FrontStudio, MacUser magazine, May 1992, starting at p. 56.

Product review of FontStudio, MacUser magazine, Sep. 1990, pp. 76 and 80.

*Adobe Type I Font Format,* publised by Adobe Systems Incorporated, 1990.

Affidavit of John Collins concering Fontographer and FrontStudio programs.

300 — -Search physical font list for a physical font record with the specified fontID
306 — -If the specified string fontID is not found
308 — -create a new physical font record with that fontID and add it to physical font list
310 — -call GetFontInfo() to get information from the font interpreter about the physical font
312 — -call GetCharID(), and then ExecChar(), for each of the characters used for hinting, and derive hinting values for the physical font from them
314 — -Make the matching or newly created physical font the current physical font
316 — -Search the logical font list associated with current physical font for a logical font with attribute values matching those of FontAttributes
320 — -If a complete attribute match is not found, create a new logical font record with a new logical font code having those attributes, and add it to the current physical font's logical font list
322 — -Make the matching or newly created logical font record the currently active logical font
324 — -return its logical font number as the fontCode

FIG. 7

328 — -Search the current physical font's character tree for a character record with matching specified charCode
334 — -If the charCode is found, exit CsrDoChar
336 — -If the charCode is not found
    338 — -create a new character record with the charCode and place it in the character tree
    340 — -initialize character shape processing
    342 — -call ExecChar for that character
    344 — -until ExecChar returns
        346 — -when the funtion called by ExecChar is CsrMoveTo
            348 — -if there is a contour open
                352 — -complete and close the contour
                354 — -insert the contour into the contour tree
            350 — -open a contour, with the start position indicated by the CsrMoveTo
        358 — -when the function called by ExecChar is CsrLineTo, CsrCubicTo, or CsrQuadraticTo
            360 — -if no contour is open, exit reporting an error
            362 — -store points associated with each successive outline segment described by CsrLineTo, CsrQuadraticTo, or CsrCubicTo in Character Shape Array
            364 — -for each curve received, if it has any inflection or XY extreme (i.e., horizontal or vertical tangent) points, mark them as such, and if any of those marked points do not occur at an end of the received curve, divide the received curve into sub-curves at the marked point, and replaced the received curve with the two sub-curves in the character shape array
            366 — -for each on-outline point received for which two adjacent outline segments have been received, detect if it is a corner or tangent, and if so mark it as such, and update the contourBBox if it is an X or Y max or min, and the actual contour direction if it is an X maximum
            368 — -for the outline segement between each pair of successive marked points in the character shape array
                420 — -approximate it with a line or cubic bezier curve
                422 — -if it is approximated with a curve, calculate curve depth
                424 — -put points representing the approxmated segment into the open contour
                426 — -if any of the newly approximated segment's corresponding points in the character shape array are not part of a line segment adjacent to an as-yet unapproximated segment, delete them from the character shape array
460 — -save location in open contour as escapement value for character
462 — -flatten the contour tree to two levels to separate glyph elements
464 — -for each glyph element...
    466 — -standardize contour direction
    468 — -standardize contour start point
    470 — -build edge and stroke lists
    472 — -generate glyph signature
    474 — -search glyph record tree for a glype record with a matching signature
    476 — -for each match found
        488 — -compare it glyph program strings (GPS)with that of current char
        490 — -if they match, mark the match for the current char
    478 — -if no GPS match is found for the new glyph record, insert it into the glyph record tree, unless its GPS exactly matches that of a record already in the tree
480 — -write the char's gps in order indicated by the character's contour tree, a using DOCH if it has more than one glyph or if any of its glyphs match a previously recorded GPS
496 — -update font bounding box

FIG. 9

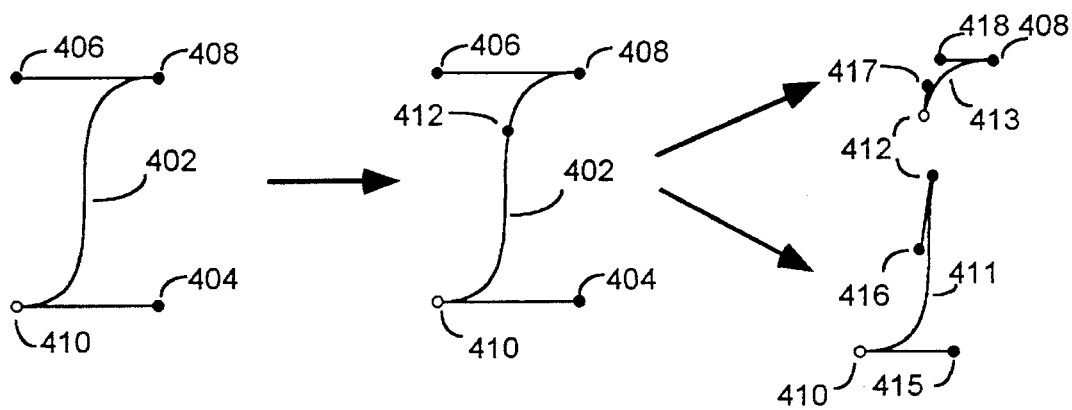

FIG. 11

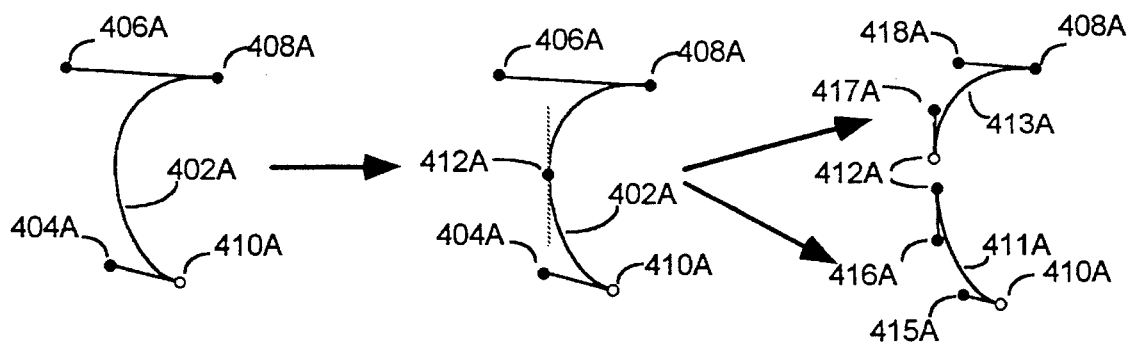

FIG. 12

370 — -find the left-most and right-most vectors (1L and 1R, respectively) from the point preceding the point being tested and a 2 ORU square centered around the point being tested 372 — -find the left-most and right-most vectors (2L and 2R, respectively) from the point being tested to a 2 ORU square centered around the following point 373 — -if both 2L and 2R are left of 1L and 1R, label the tested point as a definite left corner 374 — -else if both 2L and 2R are right of 1L and 1R, label the tested point as a definite right corner 375 — -else if 2L is to the right of 1R and 2R is to the left of 1L, label the tested point as a corner of indeterminate direction 376 — -else label the tested point as not being a corner

FIG. 13

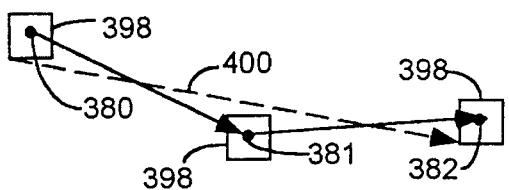
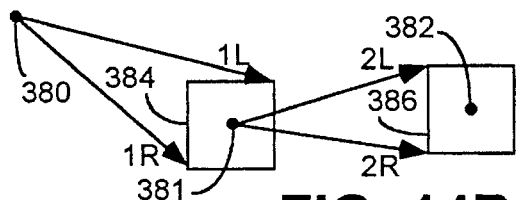
FIG. 14A  FIG. 14B
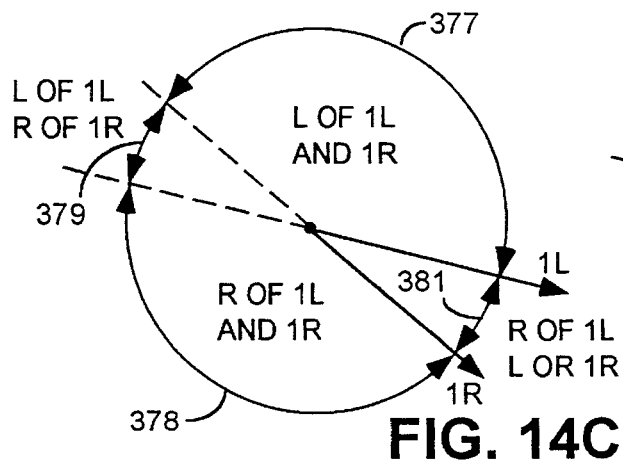
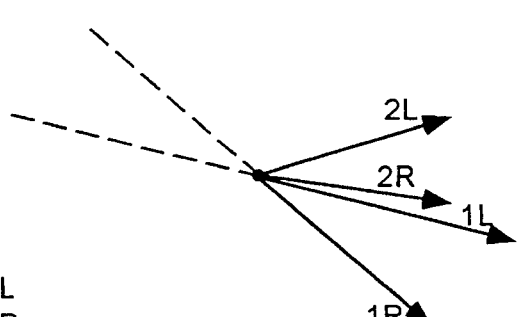
FIG. 14C  FIG. 14D
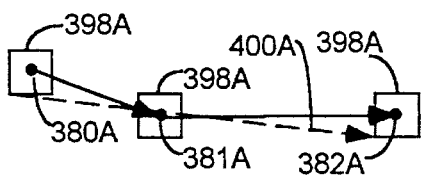
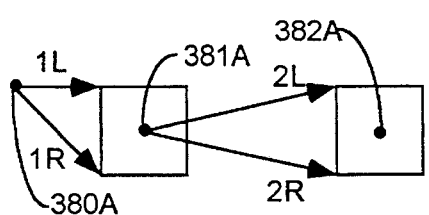
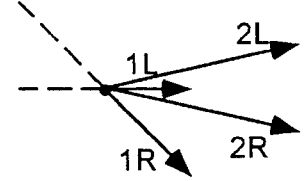
FIG. 15A  FIG. 15B  FIG. 15C
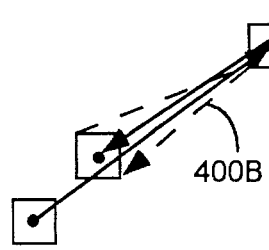
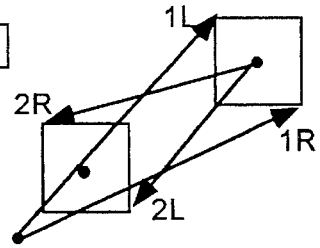
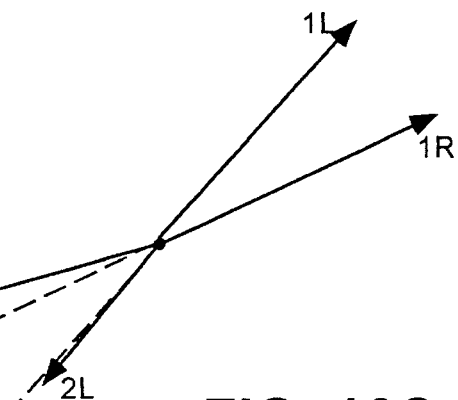
FIG. 16A  FIG. 16B  FIG. 16C 430 — -if the distance from a vector between the entire curve's endpoints to the furthest of its control points is less than 1/2 ORU, return with a MaxDepth of 0

432 — -call the RecursiveSubdivision subroutine for the entire curve with a depth of 1

434 — -if one end of deepestSubCurve is one end of entire curve, call the RecursiveSubdivisioin subroutine for the half of the entire curve which contains the opposite end of that curve with a depth of 2

436 — -return with MaxDepth

FIG. 17

-RecursiveSubdivision (p1stEnd, p1stControlPoint, p2ndControlPoint, p2ndEnd, pdepth)

440 — -if depth > maxDepth, set maxDepth = depth

442 — -divide the curve bounded by 1stEnd and 2ndEnd into two sub-curves at a midPoint 444 — -measure the greatest deviation between the control points of each sub-curve and a vector between the endpoints of that sub-curve 446 — -if the greatest deviation for both sub-curves is less than 1/2 ORU, store 1stEnd and 2ndEnd in deepestSubCurve and return 448 — -otherwise call the RecursiveSubdivision subroutine for the subcurve with the greatest deviation

FIG. 18

126 — -PFR Structure
   500 — -logical font directory
   502 — -first logical font record
        -FontAttributeValues
        -physicalFontOffset
        -physicalFontSize
        -...
   502 -...
      -physical font record
   504
        -font resolution and size
        -font hinting information
        -...
      -character record
   510
        -glyphProgramStringOffset
        -glyphProgramStringSize
   510 -...
504 -...
506 -simple glyph program string
506 -...
508 -compond glyph program string
508 -...

FIG. 20

APPARATUS AND METHODS FOR CREATING AND USING PORTABLE FONTS

REFERENCE TO PRIOR APPLICATION

The present application is a divisional application of U.S. patent application Ser. No. 08/250,372, filed by the inventors of this application, John S. Collins and Mark H. Goldwater, on May 27, 1994.

FIELD OF THE INVENTION

The present invention relates to computer font technology, that is, the computer technology of representing and generating the shapes of alphanumeric characters and other images used with text.

BACKGROUND OF THE INVENTION

Since the beginning of the written word, creators of documents have been concerned not only with how their words would sound to the ear if spoken, but also with how they appear to the eye when read. Before the advent of print, calligraphy was a major art form. With print, the art of creating and using fonts has superseded calligraphy in importance.

A font is a set of shapes representing each character in an alphanumeric character set. Usually the shapes of different characters in each font share certain characteristics, such as horizontal and vertical position of certain shape features, the general width of their vertical and horizontal strokes, and whether or not they are serifed, bold, or italic, so that the characters of a given font look appropriate together.

Commonly a font is identified by a basic font name, such as "Courier", "Arial", "Helvetica", or "Times New Roman" which identifies the general shapes of its characters, independent of size. These basic font names are often trademarks owned by the designers of the font. The basic font name is often followed by a point size designation which specifies the size of that font. Sometimes other words are inserted between the basic font name and the point size, such as "bold", which means its strokes are to be thicker; "narrow", which means its entire characters are to be made more narrow; "italic", which means its characters are to be slanted; or "oblique", which is used for sans serifed characters and means its characters are to be slanted.

The ability to vary fonts has many advantages. It lets a user vary the size of his letters to pack text more densely when necessary and to allow text to be more easily read. Using different fonts also has the ability to visually distinguish different parts of the text. This makes texts easier to scan and use. In addition, some texts are more visually pleasing than others, whereas some are easier to read. Different fonts appeal to different aesthetic senses. Some appear traditional, some modern, some art nouveau, some art deco, some hand written, some humorous, and some shocking. The ability to select from a wide variety of fonts greatly increases the ability to tune the aesthetic message of a document.

When the computer age started, most computers only represented text in one font. In the last decade or so, however, an increasing percentage of computer systems have the ability to display and print text in several different fonts. Most such computers have font resources which contain pre-defined font descriptions for the shape of each character of each of the fonts it can handle. The pre-defined font descriptions describe character shapes in a specified form or language.

Some font languages represent shapes as bitmap images which can be translated directly to the pixels on a video display or a laser printer. This has the advantage of being fast, but it has the disadvantage of requiring a different set of font descriptions for each different size.

More recently there has been a trend to scalable font languages. These languages define character shapes in terms of the one or more outlines which define its shape. Each such outline is defined by a move to a starting location and then a sequence of outline segments, each of which is either a line or a curve, such as a Quadratic or Cubic Bezier curve or a circular arc, followed by a move to the standard position for starting the next letter. A Bezier curve is a well-known type of curve defined by its two on-curve endpoints and one or two off-curve control points located between them. Quadratic Bezier curves only have one off-curve control point, with the curve at each endpoint being tangent to a line from that endpoint to the control point and with the angle of the curve reflecting the angle formed by those tangent lines. Cubic Bezier curves have two off-curve control points, with the curve at each endpoint being tangent to the line to its closest control point and with the curve's extent in the general direction of each such tangent near an endpoint being a function of the length from that endpoint to the tangent's associated control point. The lines and segments are usually defined in a resolution of either 1000×1000 or 2048×2048 units, called outline resolution units, or ORUs. Since these font descriptions define a shape in terms of lines and curves and since that definition is made with a high resolution, they can be used to generate font images of virtually any desired size.

In scalable font technology the set of font descriptions defining the outline shapes of each character in a character set can be considered a base, or physical, font. The variously sized fonts generated from such a physical font are considered logical fonts, because they do not have separate shape descriptions associated with their characters, but rather generate such shapes at the specified size from the scalable physical font description. Using such nomenclature, there would be, for example, physical font associated with the base font name "Arial", and that physical font would have associated with it any logical font which had the name "Arial" followed by a point size specification, such as "Arial 12" or "Afial 24". Normally a separate physical font is provided for font names which include "Bold", "Italic", or "Narrow", but fonts with the word "Oblique" in their name are often generated by slanting the shapes of the corresponding physical font, and the same could be done, if necessary for "Italic" if no corresponding italic physical or base font is provided.

There are currently several major scalable font languages. They include PostScript, developed by Adobe Systems Incorporated, of 1585 Charleston Road, Mountain View, Calif. 94039, TrueType, developed by Apple Computer, Inc., 20525 Mariani Avenue, Cupertino, Calif. 95014; Speedo, developed by Bitstream Inc., the assignee of this application; and Intellifont, developed by the AGFA division of Miles Inc, 90 Industrial Way, Wilmington, Mass. 01887. Each of these languages uses a different code or format to describe shapes and represents shapes in different ways. For example, TrueType uses quadratic Bezier curves to define the shape of curve segments, whereas PostScript and Speedo use Cubic Bezier curves, and Intellifont use circular arcs.

For a computer to render a font named in a given document, it requires not only a bitmapped or scalable font description of that font's characters, but also software, called a font interpreter, that knows how to interpret the particular code in which each font language's font descriptions are written and convert them into a bitmap pattern or a sequence of moves and outline segments.

Unfortunately, not all computers have the same font descriptions or the ability to interpret the same font languages. This creates a problem if an electronic document is created on a first computer using one or more given fonts and is then transferred to second computer which does not have those fonts or which cannot interpret them. In such a case, when the document is shown or printed on the second computer it has different fonts than intended. This can cause the document to have a very different, and often undesired appearance, and can disrupt its spacing and pagination. In highly formatted text, such a text with columns, this can make the text almost unreadable. In addition, some fonts have special characters not found in other fonts, or use different character codes than are commonly used in other fonts so that such a font mismatch can not only disrupt the appearance and organization of a document, but can also cause information to be lost or be garbled.

One solution to the problem of making fonted text portable is to send a copy of all fonts and font interpreters needed to properly render the characters of a document along with it. Unfortunately this has many problems. First, finding out what fonts and interpreters need to be sent with each such document and installing them on the viewing machine would be labor intensive. Furthermore, it would present legal problems because, even though the actual shape of fonts have long been held not to be copyrightable, both the code and sequence of outline segments contained in font descriptions have been considered by many to be copyrightable, and thus cannot be installed in a new machine without legal permission.

There have been multiple prior attempts to deal with this problem.

A first prior approach is to use software that enables the computer playing back a document to attempt to approximate a font called for in the document with a font which is similar, if it has one. Such systems attempt to replace one serifed font with another, one italic with another, and so on. Unfortunately, this approach still requires that the computer playing back a document have fonts which approximate those it is to replace, and the approximations are often disappointing.

Another prior technique amplifies this first approach by using software that sends information along with documents explaining the size of each character in each of the fonts used. This enables corresponding software in the playing computer to stretch or compress whatever font it is using to approximate a missing font to produce a font which has the same spacing. This provides the valuable advantage of preventing the formatting of documents from being upset due to spacing differences, but is still is only an approximation.

Another prior approach has been to embed, or include, font descriptions with the document so the party at the other end can use them. The makers of such embeddable fonts have designed them so they can only be used in the document in which they have been included and thus have granted a license for such a copy of their font descriptions to be made without requiring express permission. Unfortunately, all such systems of which we are aware only work with fonts of one language and assume that the computer on which their documents are to be played has interpreters for that language. Thus the documents produced cannot be properly reproduced if the machine playing them back does not have the proper font interpreter and it even if does, it can only provide insured portability for fonts written in that interpreter's one language.

Another prior approach is to have a document recorder application which records bitmap images of all character-font shapes included in a document from the font interpreter of the computer creating the document and embeds them in a copy of the document. The resulting portable document is designed to be viewed or printed from a player application on another computer. The player renders the shape of each character in the document from its associated embedded font. The program has the ability to, in effect, creates bitmapped physical and logical fonts. That is, if the user decides he or she does not want to have to store separate bitmap images for the same shape font in different sizes, the system will store it in one size and on playback attempt to generate bitmap patterns at different sizes from it.

This approach appears to avoid copyright problems, because it has long been held that the shape of fonts is not copyrightable and the bitmap patterns copied are determined largely by the shape of the font's original pre-defined font descriptions rather than from the actual code or sequence of moves and outline segments used in that description. It also has that advantage of being able to play back any font handled by the computer creating the document. It has the disadvantages of requiring a large amount of memory to produce a large variety of fonts accurately.

SUMMARY OF THE INVENTION

It is an object of the present invention to provide an apparatus and method for creating and playing back portable documents, that is documents in which text with a variety of different fonts can be accurately played back by a machine which does not previously have font descriptions and font interpreters for all of that document's fonts.

It is yet another object of the present invention to provide such an apparatus and method which creates such portable documents automatically.

It is still another object of the present invention to provide such an apparatus and method which creates back such documents quickly.

It is yet another object of the present invention to provide such an apparatus and method which creates such documents with portable font description which do not require much storage space.

It is still another object of the present invention to provide an apparatus and methods for automatically creating new font descriptions of character shapes defined in old font descriptions while avoiding copying certain features in such old font descriptions which are not required to describe those shapes.

According to one aspect of the invention, a computerized apparatus and methods for character shape recording are provided. The character shape recording develops new font descriptions from shapes received from a pre-defined descriptions. It does so by modeling each such shape to find features, which are a function of that shape itself, rather than the particular manner in which the pre-defined description defined that shape. Such features often are not explicit in the pre-defined description of the shape, and the system has to make them explicit. Often the description-independent features are points on the outlines of the character shape. These description-independent points can include corner points with angles so large they could not be caused by rounding errors in the pre-defined description, inflection points, tangent points, and X or Y extreme points. Preferably the system bases the segmentation of the new font description it creates on such description-independent points.

Preferably the character shape recording finds new line or curve segments to approximate the segments from the pre-defined font description between such description-independent points. Preferably, it also picks the outline order, starting point for the description of each such outline, and the direction of that description according to standard rules, independently of the ordering, starting point, or direction of those outlines in the predefined description. This causes the new font descriptions to be free of non-shape-required aspects of the pre-defined descriptions, and it causes such descriptions to be highly uniform and, thus, easier to play back.

It is also preferred that the system finds the "depth" of each curve segment in the new font description. This indicates how finely the curve must be subdivided on playback so it can be accurately portrayed by vectors spanning each such subdivision. This depth is calculated by recursively subdividing the curve into subdivisions, approximating each subdivision by a vector, and recursing on the worst fitted subdivision until the worst fit is acceptable. The level of the deepest recursion indicates the curve's depth.

Preferably the system can generate new font descriptions from shapes defined in any one of a plurality of fonts and font description languages, including scalable and bitmap descriptions. If it receives pre-defined font descriptions from different fonts, it groups the new font descriptions into groupings corresponding to the those of the pre-defined font descriptions.

It is preferred that the system match outline shapes for different characters of the same or different fonts, and save storage space by recording a single description of any shape used in more than one new font description.

It is also preferred that the system generate new font descriptions from non-character shapes, such as logos and other images which can be used with text.

According to another aspect of the invention, computerized apparatus and methods use character shape recording, such as that described above, to create portable documents. This portable document creating system receives a fonted input text, accesses and interprets the pre-defined font descriptions associated with each character-font combination in the input text, and generates a new font description for the shape description interpreted for each character-font combination. Each such new font description describes its shape as a sequence of outline segments according to a new font description language. Preferably the system creates a portable document, or output text, which includes the sequence of characters in the input text, the new font descriptions for those characters; and an indication of which of new font description represents the shape of each such character.

BRIEF DESCRIPTION OF THE DRAWINGS

These and other aspects of the present invention will become more evident upon reading the following description of the preferred embodiment in conjunction with the accompanying drawings, in which.

Figure 1:
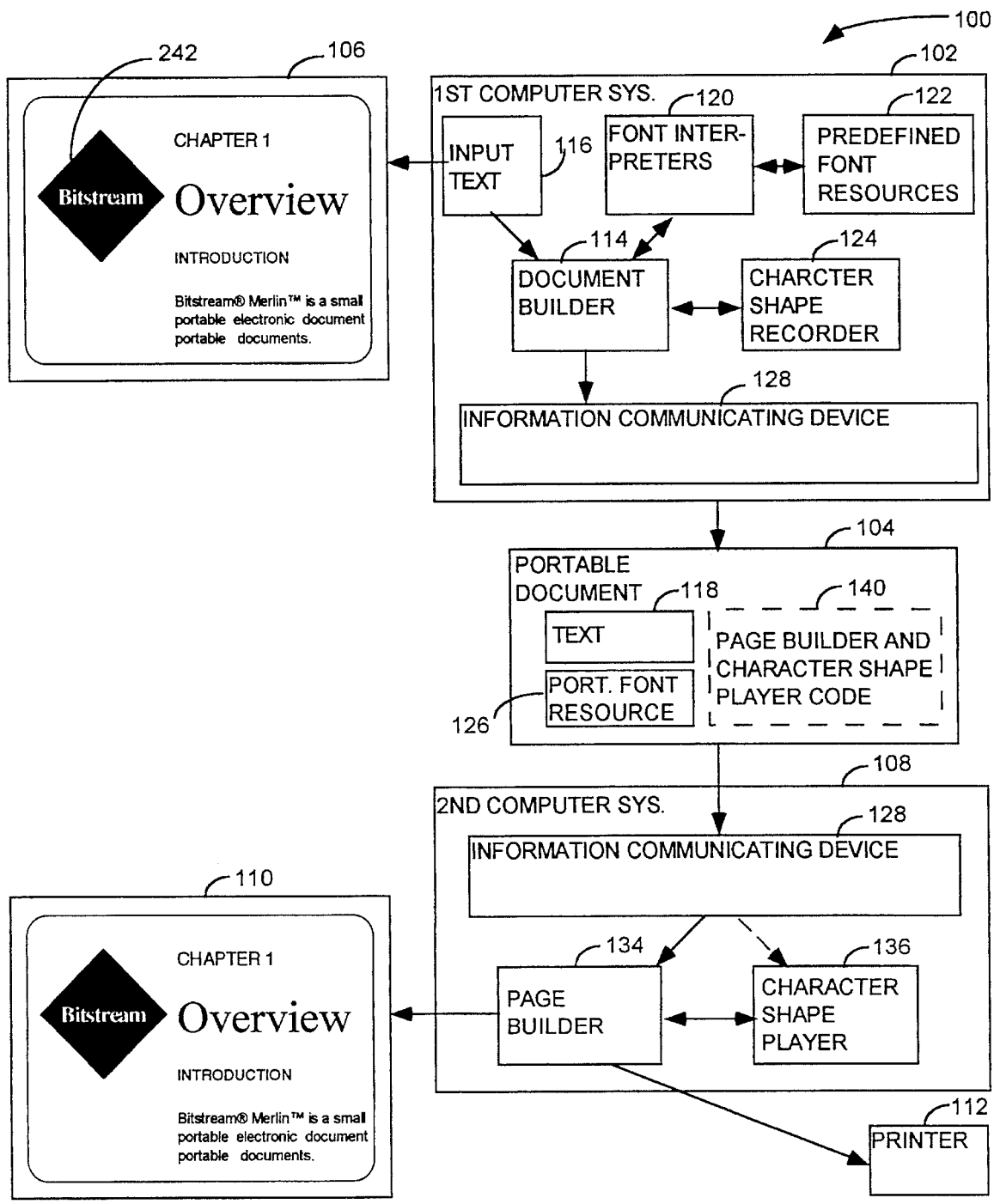
FIG. 1 is a high level block diagram of one embodiment of the invention in which a first computer converts an input text written using a plurality of pre-defined font descriptions into a portable document having new font descriptions and in which a second computer receives the portable document and renders an image of it using the new font descriptions it contains.
Figure 4:
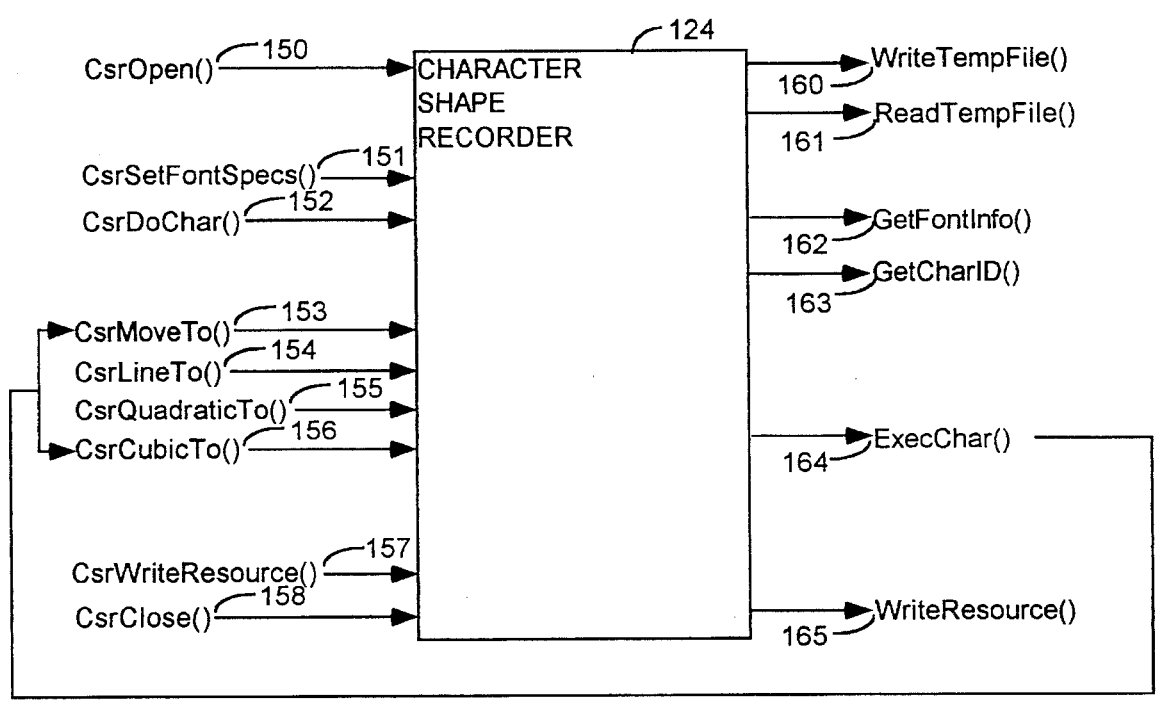
FIG. 4 is a diagram of the functional interface of a character shape recorder software module designed according to the present invention for a plurality of uses, including use as the character shape recorder of the first computer in FIG. 1.
Figure 5:
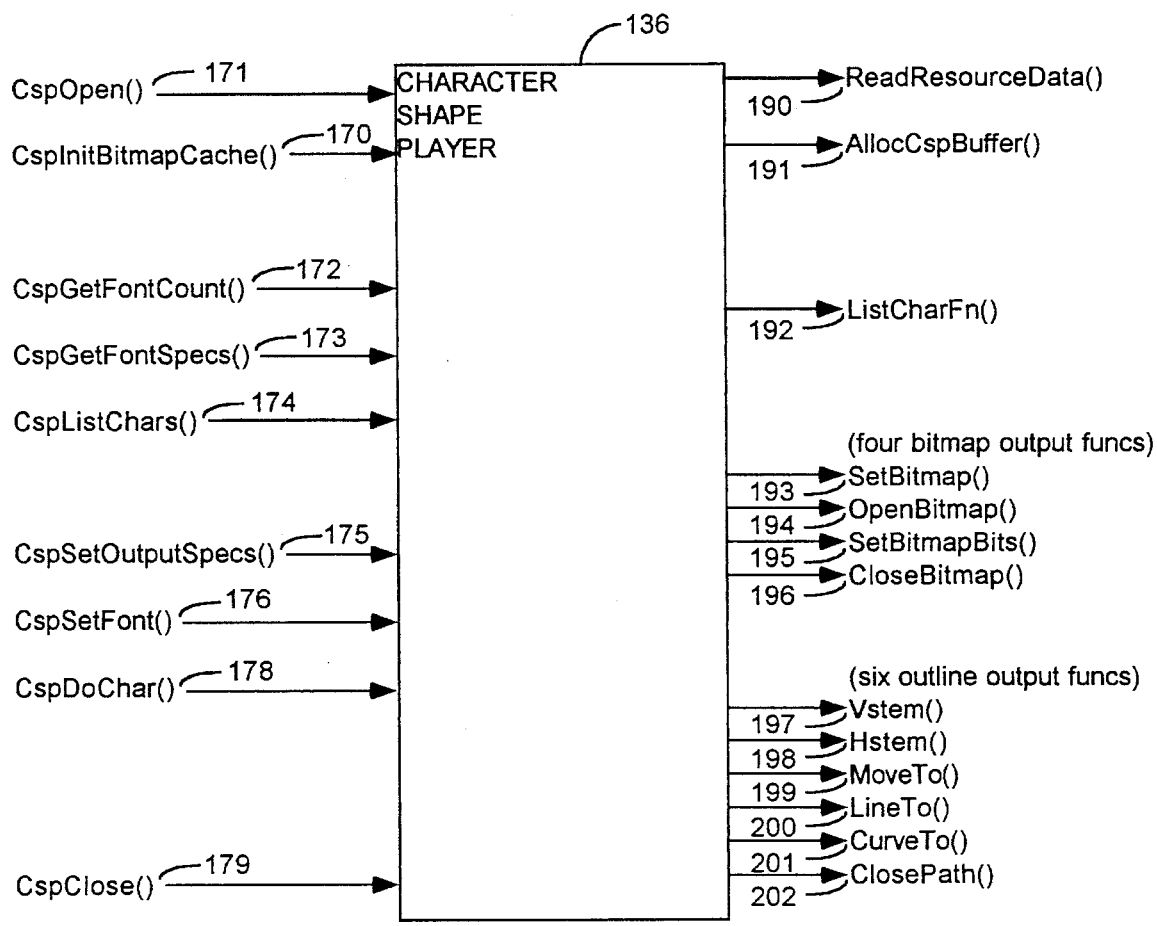
FIG. 5 is a diagram of the functional interface of a character shape player software module designed according to the present invention for a plurality of uses, including use as the character shape player of the second computer shown in FIG. 1.
Figure 6:
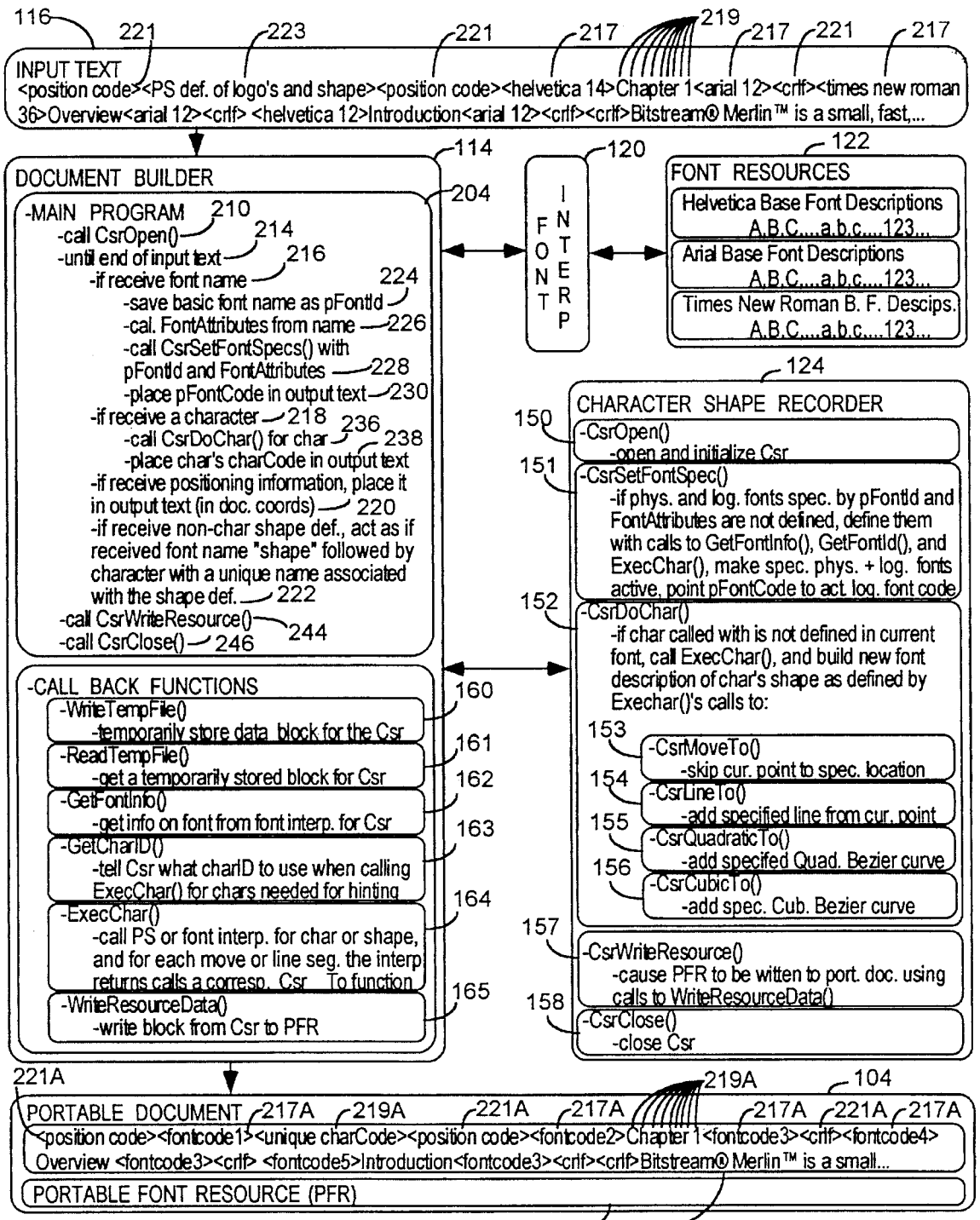
Figure 8:
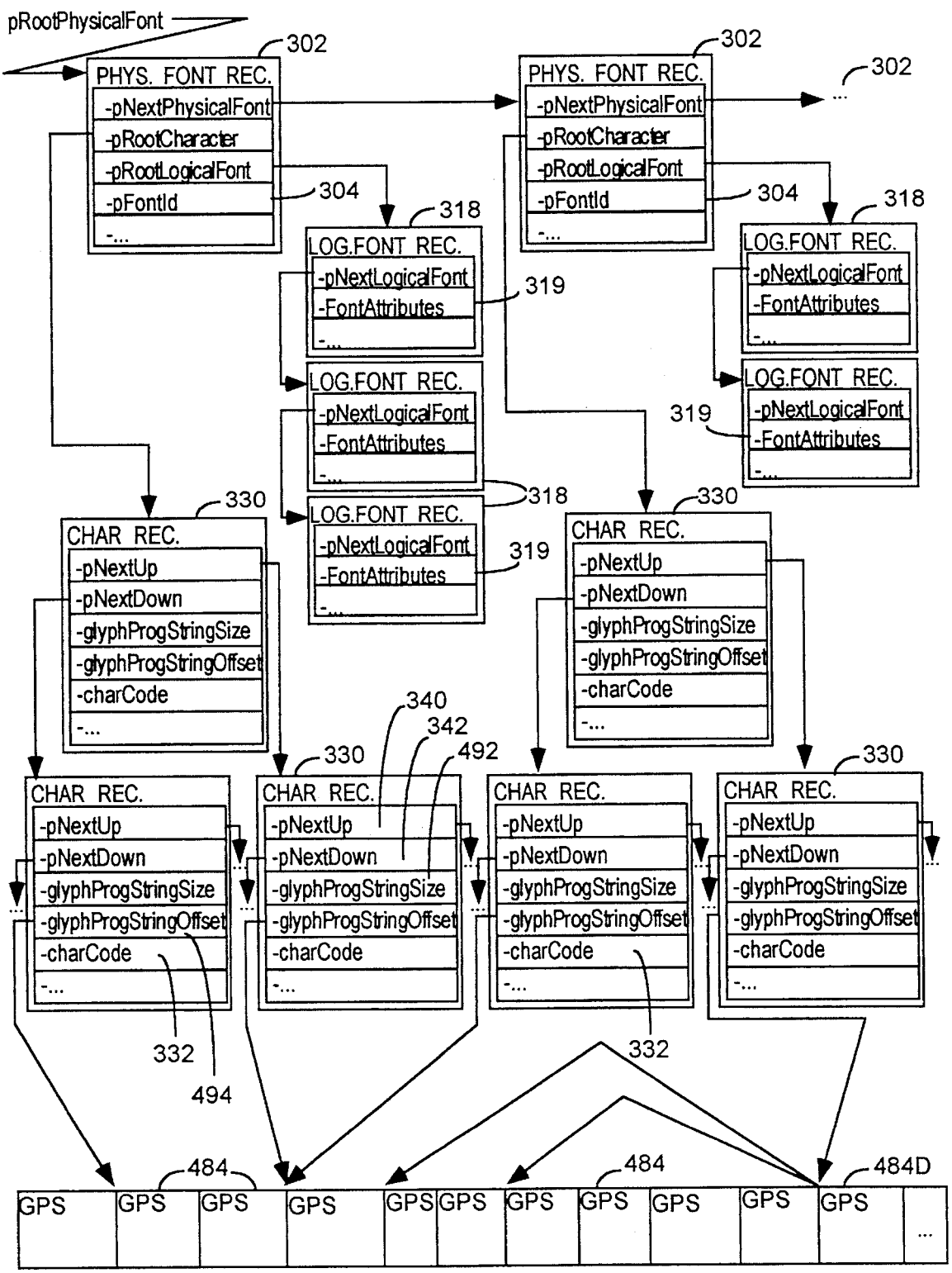
Figure 10:
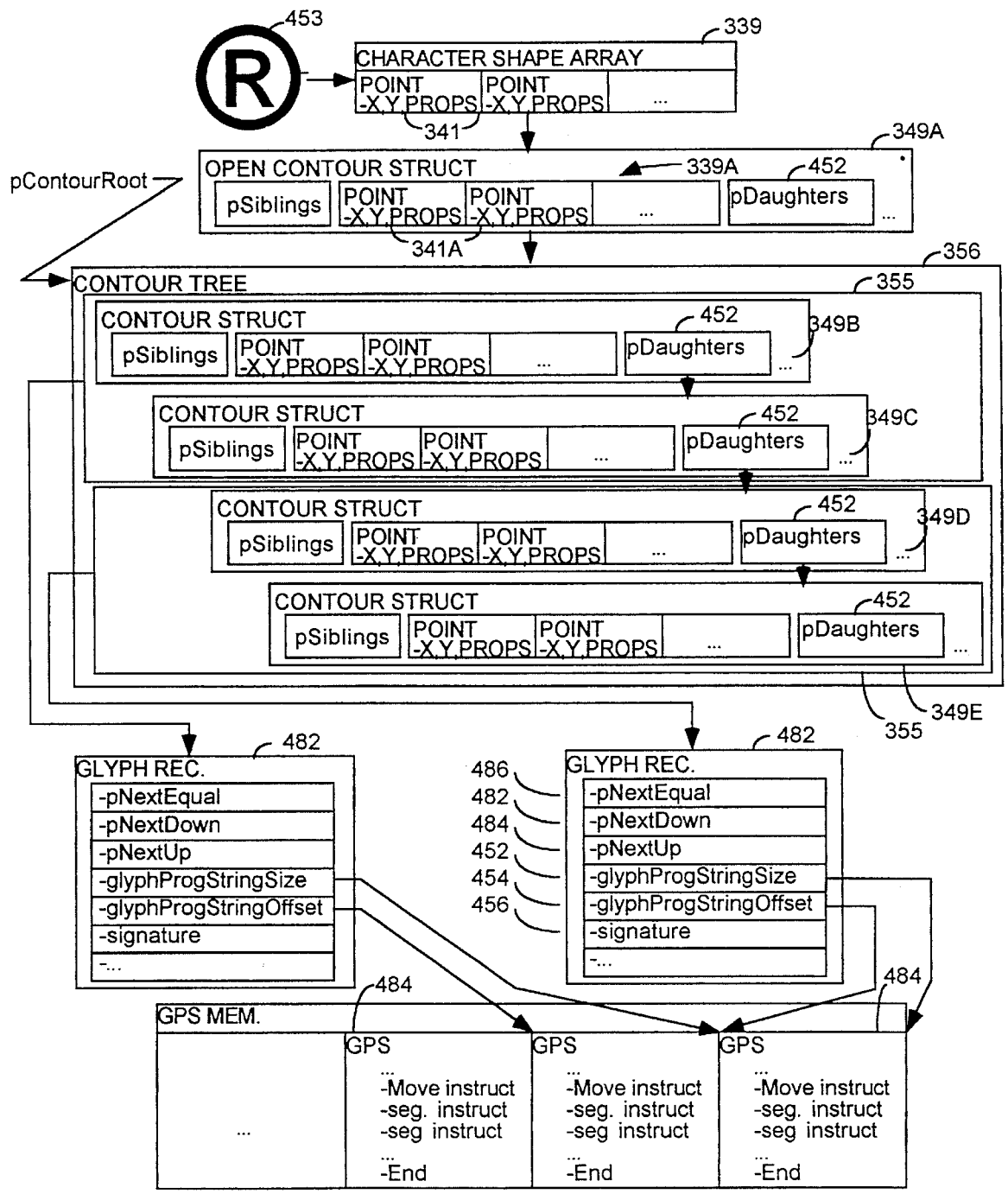
Figure 19:
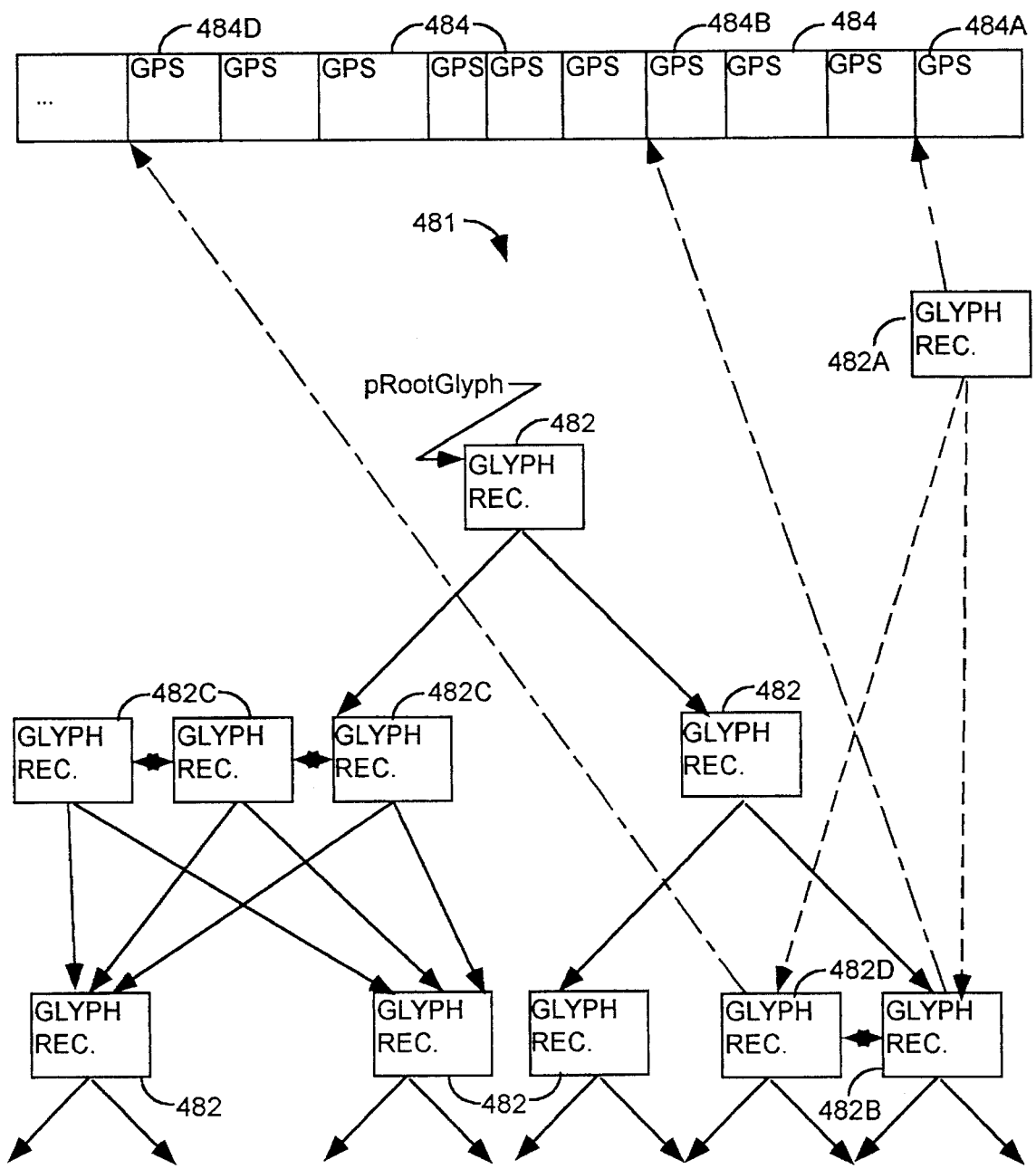
Figure 21:
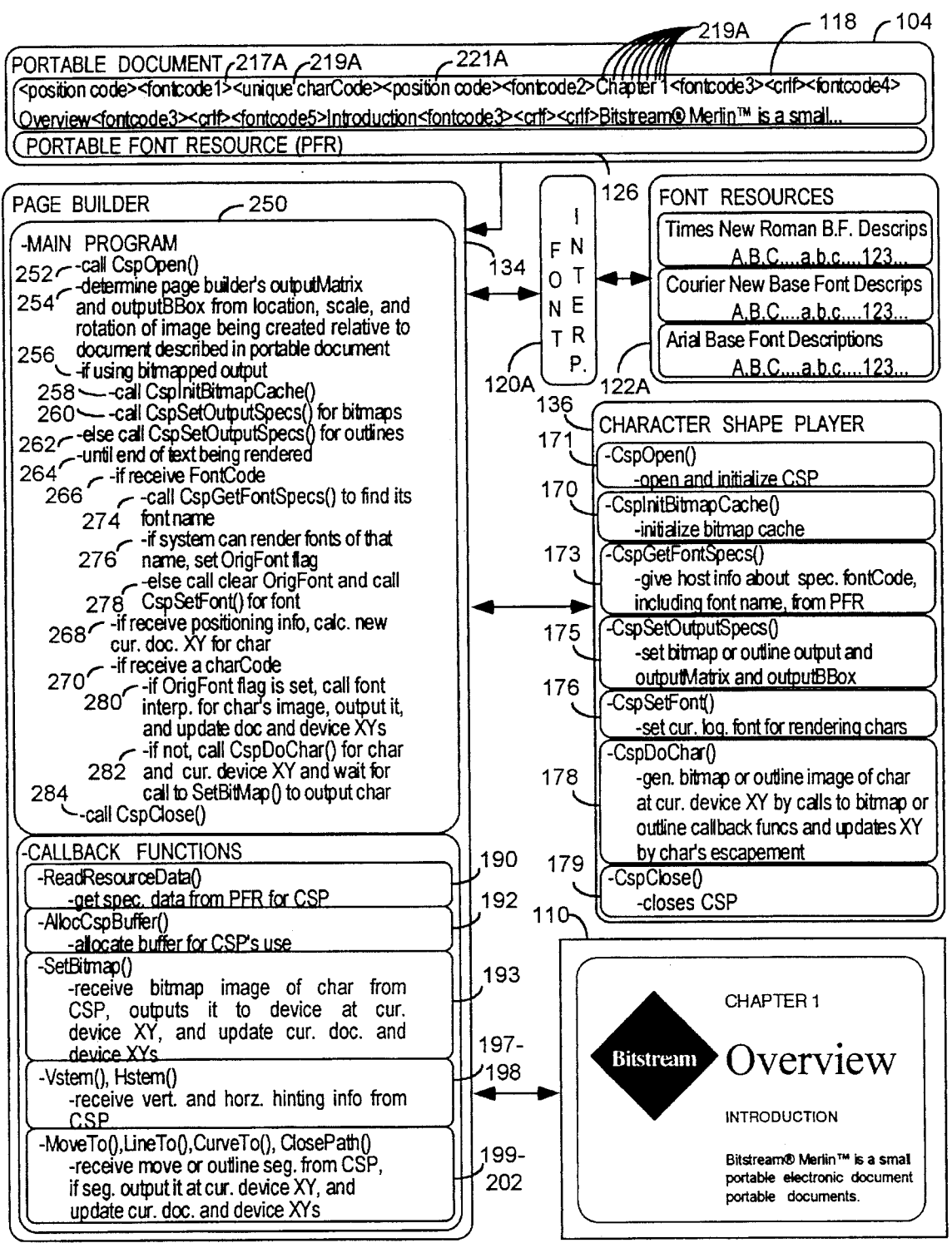

6 is a more detailed schematic diagram of the functional elements of the first computer shown in FIG. 1, in which the character shape recorder of FIG. 4 is used, including the major functional steps performed by the document builder and character shape player;

FIG. 7 is a more detailed flow chart of the functional steps performed by the CsrSetFontSpecs() function shown in the character shape recorder in FIGS. 4 and 6;

FIG. 8 is a schematic diagram of the list of physical font records created by the character shape recorder of FIG. 4 and 6, of the list of logical font records and the binary tree of character records the recorder can associated with each such physical font record, and of the links which it makes between such character records and the glyph program strings ("GPSs") which contain new descriptions of the shapes of such characters;

FIG. 9 is a more detailed flow chart of the functional steps performed by the CsrDoChar() function which is part of the character shape recorder in FIGS. 4 and 6;

FIG. 10 is a schematic diagram of the following data structures created by the character shape recorder of FIGS. 4 and 6: the character shape array, the open contour structure, the hierarchical contour tree into which contour are placed once closed, the division of that tree's contour structures into glyph elements, the glyph records created in association with each such glyph element, and the glyph program strings ("GPSs") which contain new shape descriptions derived from the contours of each such glyph element;

FIGS. 11 and 12 are a diagramatic representations of how step 364 of FIG. 9 divides curve segments received by the character shape array at inflection and X extreme points, respectively;

FIG. 13 is a more detailed description of the corner detection functionality described in step 366 of FIG. 9;

FIGS. 14 A–D, 15A–C, and 16A–C are diagrams used to illustrate the corner detection steps of FIG. 13;

FIGS. 17 and 18 are more detailed flow charts of the steps used to perform the curve depth analysis of step 422 of FIG. 9;

FIG. 19 is a schematic diagram of the binary tree of glyph records, of the type shown in FIG. 10, produced by the character shape recorder of FIGS. 4 and 6, and of the matching which is performed by that recorder for each new glyph records to see if the shape represented by its associated glyph program string ("GPS") matches that of the glyph programming string associated with any glyph record already in the tree;

FIG. 20 is a schematic representation of the data element contained in the portable font resource shown in FIGS. 1, 6, and 21;

FIG. 21 is a more detailed schematic diagram of the functional elements of the second computer shown in FIG. 1, in which the character shape player of FIG. 5 is used, including the major functional steps performed by the page builder and character shape recorder.

DETAILED DESCRIPTION OF PREFERRED EMBODIMENTS

FIG. 1 provides an overview of a system 100 for creating and playing back portable fonted documents. This system includes a first computer 102 in which the portable document 104 can be created, and its accompanying video monitor 106. It also includes a second computer system 108 in which the portable document can be played back, and its accompanying video monitor 110 and printer 112.

The computers 102 and 108 are preferably computers, such as personal computers or computer workstations, which include memory devices for storing program instructions and data structures and one or more processing element for executing such instructions and manipulating such data structures. As the computer's one or more processors execute such instructions, it forms the functional element described for each of these computers.

The first computer 102 includes a document builder 114. This document builder has means for receiving a fonted input text 116. Such a text can be received from an external source, such as a disk or data network, or it can be created in a program running on the first computer, such as a word processor or desktop publishing program. The input text is comprised of a sequence of font names, text characters, and positioning codes. Normally each text character is associated with the first font name to precede it in the sequence, and each such font name has associated with it a set of coded pre-defined font descriptions in the computer's font resource 122 describing the shape of each character in that font.

The document builder places codes corresponding to each of the input text's successive font names, text characters, and position codes into the text 118 of the portable document 104. In addition, for each unique combination of a character and font name in the input text, the document builder creates a new font description for the shape described in its corresponding pre-defined font description.

It does this by causing the first computer's font interpreter 120 to interpret the character-font shape's pre-defined font description in the computer's font resource 122. The font interpreter translates the coded pre-defined font description into a sequence of moves, lines, and curves which define the outline of the character-font shape. It provides these to the document builder. The document builder, in turn, supplies this interpreted shape description to the first computer's character shape recorder ("CSR") 124. The CSR includes the capability to model the shape contained in the interpreted description, and to produce a new font description which is virtually independent of any aspects of the interpreted font description which are not required by the shape it represents. The CSR returns this new font description to the document builder, which then places it in the portable document's portable font resource 126, indexed by the codes used to represent its associated font and character in the portable document's text 118.

Figure 2:
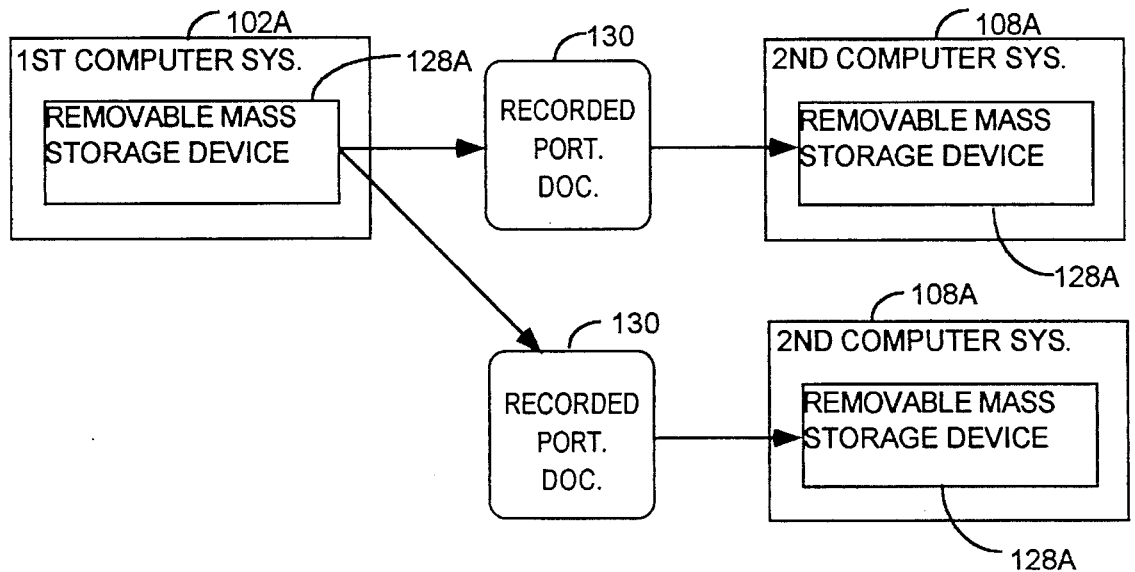
FIG. 2 is a high level block diagram of a version of the embodiment show in FIG. 1 in which the portable document is communicated between first and second computers on a removable mass storage medium.
Figure 3:
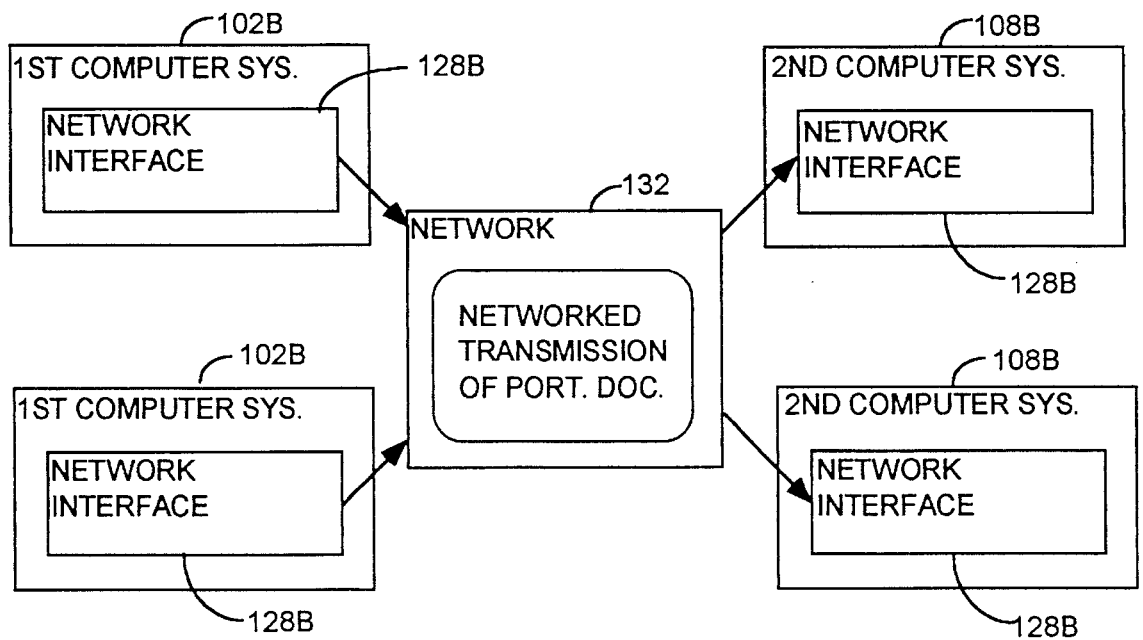
FIG. 3 is a high level block diagram of a version of the embodiment shown in FIG. 1 in which the portable document is communicated between first and second computers over an electronic data network.

Both the first computer 102 and the second computer 108 include a device for communicating information between them. As is indicated in FIG. 2, this device can be a device 128A for communicating the portable font resource from the first to the second computer on a removable mass storage medium 130, such as a magnetic or optical disk, CD, or tape. The removable medium 130 can include singly produced copies, or mass produced copies. As is indicated in FIG. 3 it can also be a network interface 128B which can communicate the portable document over a network 132. The network 132 can include LANs, WANs, telecom connections, on-line services, the internet, and, in the future, the so-called information highway.

The second computer 108 also includes a page builder 134 and a character shape player ("CSP") 136. The page builder creates a rendered image, such as a page image or a screen image from the portable document. It reads the successive font, character, and position codes from the text 118 of the portable document 104. It uses the font codes to determine the font associated with each character. It uses the position codes to position the characters in the rendered image. In response to each character code, it asks the CSP to generate the shape for that character given its associated font code. The CSP generates this shape from the new font description indexed under that character and font in the Portable Font Resource 126. It delivers this shape to the page builder which places it at the proper location in the rendered image, and which then sends that rendered image either to an output device, such as the video monitor 110 or the printer 112.

Thus, it can be seen that the embodiment of the invention shown in FIG. 1 allows a fonted document created with the font interpreters and pre-defined font resources of the first computer, such as that shown in the first computer's display 106, to be communicated to, and visually rendered with virtually the exact same appearance by a second computer which does not have those font interpreters and font resources. And it does so without copying the copyrightable shape-independent aspects of the first computer's pre-defined font descriptions.

Since the character shape recorder 124 of the first computer can create a new font description for any shape described to it as a sequence of moves, lines, and quadratic and cubic Bezier curves, it can create new font descriptions from any font description language which the first computer's font interpreter can interpret into such a sequence of move, lines, and curves. Since all the major font description languages have associated font interpreters which can provide such output, or output which can be easily converted into such a form, this means the invention can be used with all such font description languages, even if they occur in the same document.

In some alternate embodiments of the invention the document builder includes means for placing representations of bitmap fonts in the portable font resource 126. This includes means for recording the bitmap pattern received from the font interpreter 120 for small fonts directly as the font descriptions for such images in the portable font resource. The document builder in such embodiments also includes means, used when larger bitmaps are received, for performing edge detection on the bitmap pattern, creating a move instruction to a first point on each edge in the pattern, and a line corresponding to the distance between each successive point on that edge, and supplying that sequence of moves and line segment to the character shape recording process described above. With these features, it can be seen that the invention enables virtually any document created with virtually any font to be accurately reproduced on another computer which does not contain the original font descriptions from which it was created.

The basic concept disclosed in FIG. 1 has many applications. In some, the document builder 114 and character shape recorder 124 are built directly into a user application, such as a word processor, draw program, or desktop publisher. In others, it is built into the operating system. In others still it is placed in a driver module which is interfaced to as a printer driver, so that it can interface to virtually any major application designed to run on its associated computer platform.

Similarly, in some applications the page builder 134 and character shape player 136 are built into a much larger user application. In others, it is part of special portable document viewer application. And in others still, it is built into the operating system.

The nature of the portable document varies with use of the document builder 114, recorder 124, page builder 134, and character shape player 136. For example, in many systems in which these modules are all built into a much larger user application, the portable document is a normal file for that application. In systems in which the document builder and recorder are in a print driver module and the page builder and player are pan of a document viewer program, the portable font document cannot normally be read by the application which originally created its fonted text. In systems in which the document builder, recorder, page builder, and player are incorporated into the operating system, any file produced by any application compatible with that operating system can be a portable document 104.

In some embodiments, a single computer includes both the document builder and recorder, as well as the page builder and player, so that computer can both send and receive portable documents.

In some embodiments the portable document includes the page builder and player code so a computer reading the portable document can view the portable documents text and fonts without having to previously have a copy of the page builder and recorder.

FIGS. 4 and 5 show a preferred embodiment of the character shape recorder 124 and character shape player 136, respectively. In this embodiment, both the recorder and player 136 have been designed as discrete software modules. They have been modularized so their code can be used in a plurality of different software applications, different computers, and different operating systems. They have been written in the commonly used C programming language which is supported on almost all major computer systems. They do not include any functions which are operating system dependent. And they do not include much functionality that is likely to vary from application to application.

In some embodiments, for example, the recorder and the player are part of a software application that run on Unix, IBM PC compatible, and Apple Macintosh computers. In each machine dependent version of this application they are surrounded with code which interfaces with the operating system, performs the functions of the document and page builders, and creates portable documents which can be read by the corresponding versions of the application on the other types of computers. This enables fonted portable documents created on one type of computer to be played back with virtually the exact same appearance on another types of computer.

The modularization of the recorder's and the player's functionality also allows them to be used for purposes different than that described in FIG. 1. For example, in one embodiment of the invention the recorder is used as part of a program which creates sets of new font descriptions from sets of pre-defined font descriptions, independently of any input text. Once created, such new fonts can then be used with any application containing a player module.

In FIGS. 4 and 5 the function calls which can be made by host software using each module are shown on the left. These are the functions 150–158 in FIG. 4 and 170–178 in FIG. 5. In these figures, the function calls made by the module back to its host software are shown on the right. These so-called "callback" functions are numbered 160–165 in FIG. 4 and 190–202 in FIG. 5. The code of the functions on the left in each figure is part the recorder or player module. The code of the callback functions on the right is included in the host software which uses such modules.

In FIG. 4, the functions CsrMoveTo(), CsrLineTo(), CsrQuadraticTo(), and CsrCubicTo(), are pointed to by a line from the callback function ExecChar() because these functions are called by ExecChar() to deliver the moves, lines, and curves which define a character's shape to the recorder.

FIG. 6 provides a more detailed schematic view of the functional elements shown in the first computer 102 in FIG. 1. It shows how the document builder 114 interacts as the host program for the modular character shape recorder 124 to convert the input text 116, which uses pre-defined font descriptions, into the portable document 14.

The document builder includes a main program 204 and the callback functions 160–165 shown on the right-hand side of FIG. 4.

The first step shown for the document builder's main program is step 210. This calls the CSR's CsrOpen() function 150. In step 212, CsrOpen() opens and initializes the player software module 124, giving it the memory buffer and temporary files it needs to work and setting up its initial data structures.

Once this function returns, the document builder's next step 214 performs a loop until it has processed all the codes in the input text 116. For each successive code received from the input text this loop performs the steps 216, 218, 220, and 222 shown indented under it.

Step 216 tests to see if the received code is a font name, such as the codes 217 shown in the input text. If so, its substeps 224, 226, 228, and 230 are performed. Step 224 saves the basic font name portion from the full font name received and points pFontId to it. Step 226 calculates the fonts attributes, such as its size, whether or not it is obliqued, and whether it is a solid or outlined font, from the full font name received and stores it in a data structure called FontAttributes. Then step 228 calls the CSR function CsrSetFontSpecs() 151 with pFontID and FontAttributes.

FIG. 7 provides a more detailed description of CsrSetFontSpecs() operation. In step 300, it searches the linked list of physical font records 302 shown at the top of FIG. 8, known as the physical font list, for a physical font record with a pFontID value 304 pointing to the same physical font name as the pFontID with which CsrSetFontSpecs() has been called. If such a match is not fond, meaning the CSR has no record for the specified physical font, step 306 creates such a physical font record by performing steps 308, 310, and 312. Step 308 actually creates a new physical font record data structure 302, having the specified pFontID value, and places it at the end of the physical font list. Step 310 calls the host document builder's GetFontInfo() callback function 162 shown in FIG. 6, to get information from the font interpreter about the physical font and it places this information in the new physical font record. This includes the ORU resolution in which the font interpreter defines the moves, lines, and curves of that physical font's shapes. It also includes the name of the physical font. Step 312 calls the document builder's GetCharID() and ExecChar() functions for each of a small sub-set of alphanumeric characters used in a process known as "hinting". For each such character, first it calls GetCharID(), which returns the character code used to identify that character in the first computer's font interpreter, and then it calls ExecChar() with the character code GetCharID() returns for that character, to get the character's shape.

This is done to get a measure of the standard horizontal and vertical positions, and standard thickness associated with certain character features in the physical font. These hinting value are recorded in the physical font record, and are ultimately stored with the physical font in the portable document. This is done so they can be used by the character shape player to shift the position of important edges of a character's outlines when the character is rendered, so as to produce more attractive images, given the granularity of the pixel pattern used. Hinting is well known in computer font technologies. The important thing here is to note is that the hinting information recorded in the portable document 104 is derived not from hinting information contained in the pre-defined font descriptions in the first computer's font resources, but rather from the actual positions and sizes of character features in the font.

ExecChar() 164 is an important callback function used by both CsrSetFontSpecs() and CsrDoChar(). It is called by CSR functions with the name the font interpreter uses for a given character, which is normally the code for that character in the input text. It responds by calling the first computer's font interpreter 120 for that character in the current font indicated by pFontID and FontAttributes. If the font is a scalable font, ExecChar() responds to each move, line, quadratic Bezier curve, or cubic Bezier curve received from the font interpreter, respectively by calling CsrMoveTo(), CsrLineTo(), CsrQuadraticTo(), or CsrCubicTo() to deliver the definition of that move or outline segment to the CSR. In some document builders, if the font interpreter returns a bitmap pattern, ExecChar() responds by performing edge detection on the bitmap, and then describes each edge detected to the CSR with an initial move to one of its points, followed by the sequence of lines between each successive point on that edge.

Whether or not the physical font record matching the specified pFontID previously existed or was just created by steps 308, 310, and 312, step 314 makes that physical font records the currently active physical font.

Then step 316 searches the linked list of logical font records 318 associated with the currently active physical font record 302 for a logical font record having FontAttribute values 319 matching those with which CsrSetFontSpecs() was called. These values include the fontMatrix, which defines how the physical font is to be scaled and slanted (if at all) to produce a character shape defined in document coordinates. It also includes information about whether or not the character shape is to be rendered in solid or outline form, and if in outline form, how thick the outlines should be and how they should join at angles. If such a prior logical font record having the specified FontAttributes is not found, step 320 creates a new logical font records at the end of the logical font list hanging from the current physical font record and records the specified FontAttribute values 319 in it. Then step 322 makes the previously existing or newly created logical font with matching FontAttributes the CSR's currently active logical font, and step 324 returns to the document builder with a code which uniquely identifies the currently active logical font pointed to by pFontCode.

After CsrSetFontSpecs() returns to the document builder, step 230 places the FontCode 217A pointed to by pFontCode into the sequence of codes in the text 118 of the portable document. Once this is done the program advances to the top of loop 214 to process the next code received from the input text.

If the code received from the input text is a code 219 representing a character, the test in step 218 will be met and steps 236 and 238 will be performed.

Step 236 calls the CSR's CsrDoChar() function 152 for the character. This function, which is shown in more detail in FIG. 9, is one of the most important pans of the CSR, because it actually performs the character-font shape recording process. Its first step, step 328, searches the binary tree of character records 330, shown in FIG. 8, which is hung off the currently active physical font record 302 for a character record having a charCode 332 matching that for which CsrDoChar() has been called. The tree is a binary tree, a well known type of data structure, because each of its character record can point to two child character records, one through a pNextUp pointer 340 and one through a pNextDown pointer 342. Records are added to the tree such that all records descending from a given record which have a charCode less than that of the given record descend from the given record's pNextDown pointer and all records descending from it which have a higher charCode descend from pNextUp. This enables the tree to be rapidly searched, by following pNextDown or pNextUp, respectively, at each record if the specified charCode is less or greater than the charCode at that record. This process is followed until either a record which matches the specified charCode is found or a pNextDown or pNextUp with a zero pointer is found, meaning such a matching character record does not exist in the tree If such a matching charCode is found in one of the current physical font's associated character records, a previous call to CsrDoChar() has already recorded the shape of the current character in the current font, and thus CsrDoChar() has nothing further to do. In this case step 334 returns to the document builder. If such a match is not found, step 336 causes the rest of the steps shown in FIG. 9 to perform character shape recording.

The first step in the character shape recording, step 338, creates a new character record data structure 330 and inserts it into the binary tree at the appropriate location, given its charCode. If pRootCharacter has a zero value, the tree is empty indicating this is the first character being processed for the current physical font. In this case the new character record is inserted as the root of the tree and pRootCharacter is pointed to it. If the tree isn't empty, the new character record is inserted at the point at which the above described search of the tree encountered a zero pNextDown or pNextUp pointer, and that pointer is pointed to the new record. The system checks to see if the tree is unbalanced, with many more records depending from one side of some of its records than from the other. If so it is rearranged to balance it so that the tree has as few levels as possible, and thus can be searched most rapidly.

Once step 338 has inserted the character record for the character being processed into the character tree, step 340 initializes character shape processing by setting up its associated initial data structures, including the beginning of the character shape array 339 shown in FIG. 10. The character array 339 stores, in a succession of point structs 341, the points which describe the outline segments received from the document builder's ExecChar() function 164. Then step 342 calls the document builder's ExecChar() function 164 for the character, which responds by calling the CSR's CsrMoveTo(), CsrLineTo(), CsrQuadraticTo(), and CsrCubicTo() functions 153, 154, 155, and 156 shown in FIG. 6, for each move, line, quadratic Bezier curve, and cubic Bezier curve, respectively, supplied to ExecChar() from the first computer's font interpreter. Once ExecChar() has been called, CsrDoChar() waits for ExecChar() to return, and during this wait the CSR performs initial character shape recording through the operation of the Csr—To() functions 153–156 which ExecChar() calls. For simplicity, in FIG. 9 and the description of it that follows that wait and the steps performed by the Csr—To() functions will be represented by the until loop 344 and the steps indented under it, as if they were part of the CsrDoChar() function.

When the function called by ExecChar() is CsrMoveTo(), step 346 causes steps 348 and 350 to be performed. Step 348 tests to see if there is already an open contour structure 349A, as shown in FIG. 9, and if so it performs steps 352 and 354. The open contour structure 349A is used to receive information, including outline segments, derived from the shape of the current outline being processed in the current character-font combination for which CsrDoChar() has been called. If there is such a previously open contour, the CsrMoveTo() call indicates a move away from the outline it represents to the start of a new outline. In this case, step 352 finalizes the information in the previously open contour 349A and closes it. Then step 352 places that closed contour 349 into the contour tree 356, a hierarchical tree of such closed contour structures also shown in FIG. 10. Whether or not there was a previously open contour when the call to CsrMoveTo() was made, by the time step 350 is reached there is not, and that step opens a new contour with its first point being that determined by the displacement indicated by CsrMoveTo().

When ExecChar() calls CsrLineTo(), CsrQuadraticTo(), or CsrCubicTo(), step 358 causes the steps 360, 362, 364, 366, and 368 indented under it in FIG. 9 to be executed.

Step 360 exits with an error if no contour is open, because CsrLineTo(), CsrQuadraticTo(), and CsrCubicTo() all defined a line segment relative to a previously defined point in the current contour, and if there is no such contour open, the system would not know how to interpret them.

Step 362 stores the points associated with each successive outline segment by the Csr—To() function. Each call by ExecChar() to CsrLineTo() adds one point to the array, the on-outline endpoint of a line from the previous point in the array. Each call to CsrQuadraticTo() adds two points to the array, first an off-outline control point of a quadratic Bezier curve which starts with the previous point in the array, followed by the on-outline endpoint of that curve. And each call to CsrCubicTo() adds three points to the array, the two off-outline control points of a cubic Bezier curve which starts with the previous point in the array, followed by the on-outline endpoint of that curve.

Step 364 differentiates each curved segment received by a call to CsrQuadraticTo() or CsrCubicTo() to see if that curve contains an inflection point or an XY extreme point (actually a point having a horizontal or vertical tangent). If it finds any such points it marks them as such in the character shape array, or if such points are other than on an endpoint already in the character shape array, it subdivides the curve at such a marked point, and replaces the set of points representing the undivided curve with a set of points representing each of the curves resulting from the subdivision.

FIG. 11 shows a cubic Bezier curve 402 having an inflection point in its middle. This curve is originally represented by three points received from CsrCubicTo(), first control point 404, a second control point 406, and an endpoint 408. The curve is also defined by the previous point 410 in the character shape array. Step 364 would detect that this curve has an inflection point 412. Since this point is not one of the curve's two endpoints 408 or 410, it subdivides the curves at the inflection point 412 into two new curves 411 and 413, each with two control points 415 and 416, and 417 and 418, respectively. The curve 411 has the inflection point 412 as its endpoint. The curve 413 has the endpoint 408 of the original curve as its endpoint. The points 415, 416, 412, 417, and 418 are inserted into the character shape array in place of the original curve's two control points 404 and 406. FIG. 12 shows a cubic Bezier curve 402A which is likewise split into two new curves at a horizontal tangent point.

Step 366 checks to see if there are any on-outline points in the character shape array which have line or curve segments defined on both sides of them in the array, and, if so, for each such point it checks to see if that point should be marked as a corner or tangent. Tangents are selected simply by picking points which are not labeled as a corner and which are between a curve segment and a line segment, where the line segment is of sufficient length that it is unlikely a single cubic Bezier curve could approximate the shape of both of them. Each such point is also compared with the maximum and minimum values for both the X and Y coordinates stored in the contours ContourBBox, and if it has a coordinate greater or lesser than any such maximum or minimum respectively, that maximum or minimum is updated to equal the coordinate. If the point is an X maximum, the direction of the angle formed at it, either clockwise or counterclockwise, as determined by the process of FIG. 13, is recorded as the contour's actual direction.

FIG. 13 illustrates the process used to pick points which should be marked as corners and to associate a direction with such corners, if possible. This process is performed to insure that apparent corners which could have resulted from the outline resolution unit ("ORU") quantization in shape descriptions received by the CSR are not labeled as corner points. It comprises the steps 370–376.

Step 370 finds the left-most and the right-most vectors 1L and 1R, respectively, shown in FIG. 14B from the point 380 preceding the point 381 being tested in the character shape array to a square 384. This square is two outline resolution units (ORUs) on a side, and it is centered around the tested point 381. "Left" and "right" are defined relative to the direction in which outline segments have been received in the character shape array. Step 372 finds the left-most and right-most vectors 2L and 2R, respectively, from the point 381 being tested to a similar two ORU square 386 centered around the point 382 which follows the tested point in the character shape array.

The vectors 1L and 1R represent the range of possible directions for the vector from point 380 to point 381, given the possible quantization error in the location of each such point. Similarly, the vectors 2L and 2R represent the range of possible directions for the vector from point 381 to point 382, given the possible error in those points.

Where the segment before or after the tested point 381 is a curve, the point 380 or 382, respectively, will be an off-curve control point. This is not a problem, however, since the line from the endpoint of a quadratic or cubic Bezier curve to its nearest control point is the tangent of that curve at its endpoint, and, thus a line from the endpoint to that control point reflects the angle made with the adjacent outline segment at that endpoint.

Once steps 370 and 372 have calculated the vectors 1L, 1R, 2L, and 2R, steps 373, 374, 375, and 376 perform a series of tests to see how the tested point 381 should be labeled. Step 373 tests to see if the vectors 2L and 2R each form left angles greater than zero and less than one hundred and eighty degrees with both 1L and 1R. In the example of FIGS. 14, this means it tests to see if both vectors 2L and 2R fall within the angular range 377 shown in FIG. 14C. If this test is met, it means all possible vectors between points 381 and 382, given the possible quantization error, form a left angle with all possible vectors between points 380 and 381, given that possible error, and, thus, step 373 labels the tested point 381 as a definite left corner.

If the test of step 373 is not met, step 374 tests to see if the vectors 2L and 2R each form right angles greater than zero and less than one hundred and eighty degrees with both 1L and 1R. In the example of FIGS. 14, this means it tests to see if both vectors 2L and 2R fall within the angular range 378 shown in FIG. 14C. If the test of step 374 is met, it means that all possible vectors between points 381 and 382, given the possible quantization error, form a right angle with all possible vectors between points 380 and 381, given that possible error, and thus, it labels the tested point as a definite right angle.

If neither the tests in step 373 and 374 are met, step 375 tests to see if 2L forms a right angle which is greater than zero degrees and no greater than one hundred and eighty degree with 1R and it tests to see if 2R forms a left angle greater than zero degrees and no greater than one hundred and eighty degrees with 1L. In the example of FIGS. 14, this means it tests to see that no portion of the range of possible directions between 2L and 2R falls within the range of possible directions 381, shown in FIG. 14C, between 1L and 1R. If the conditions of step 375 are met, it means that none of the possible vectors between point 381 and 382, could form a straight line with any of the possible vectors between points 380 and 382, given that possible quantization error, and so step 375 labels the point as a definite corner. But it marks the point as a corner of either left or right angle, because neither the tests of steps 373 and 374 have been met.

If none of the tests in steps 373, 374, and 375 have been met, step 376 marks the point as not being a corner.

The application of these tests to the set of points shown in FIGS. 14A and 14B is shown in FIG. 14D. In this figure it can be seen that range of possible vectors between 2L and 2R falls into the portion 377 of the arc which is clearly to the left of the range of possible vectors between 1L and 2R. Thus, the test of step 373 is met and the tested point is labeled as a definite left turn, one which has too sharp an angle to have resulted from ORU quantization. This is indicated in FIG. 14A, because even if the X and Y value of each point 380, 381, and 382 were allowed to vary in either direction by the maximum ORU rounding error of one half ORU, as indicated by the one ORU squares 398 centered around those points, it would be impossible to draw a straight line 400, shown as a dotted line in the figures, through those points.

In the case shown in FIG. 15A–C, the apparent left angle between the points 380A, 381A, and 382A is sufficiently slight, given the distance between them, that a line 400A could be drawn which touches all three squares 398A, indicating that the apparent angle between the points could have been created by ORU rounding errors. As is indicated in FIGS. 15C, none of the tests of steps 373, 374, and 375 will be met because the range of possible vector directions between 2L and 2R does not lie entirely to the left, entirely to the right, or entirely out of the range of possible vector directions between 1L and 1R. This being the case, step 376 labels the tested point as a non-corner.

In the case shown in FIG. 16A–C, the apparent left angle is sufficiently sharp that it is clearly a corner, but the quantization error is large enough that it could actually be a right turn, as indicated by the dotted angled line 400A, rather than a left turn. In this case, as is indiated in FIG. 16C, the range of possible vector directions between 2L and 2R is neither entirely to the left of, or entirely to the right of, the range of possible directions indicated by 1L and 1R, and thus the tests of steps 373 and 374 will not be met. But that range of possible directions indicated by 2L and 2R is entirely outside of the range of possible directions indicated by 1L and 1R, and, thus, the test of step 375 is met and the tested point is labeled as a corner of either left or right direction. This being the case, the character shape recorder will use the point as a marked point for segmentation purposes in step 368 of FIG. 9, but it will not use the corner for a calculations of contour direction in step 366 of that figure if that corner is an X maximum. Instead it will leave the last definate direction, if any, associated with a corner which was at the time of its processing an X maximum as the actual direction of the contour.

Once steps 364 and 366 have been performed, step 368 performs steps 420, 422, 424, and 426 for the portion of the outline segment in the character shape array located between successive pairs of points which have been marked as inflections, XY extremes, corners, or tangents by steps 364 and 366.

Step 420 approximates any such portion of the outline, which may cover one or more segments in the character shape array, with a line or cubic Bezier curve. If the outline portion between the two marked points is a simple line or cubic Bezier curve, then that line or Bezier curve is used as the approximation. Otherwise, line or curve fitting techniques are used to find the approximation.

If the outline portion is approximated with a curve, step 422 calculates the "depth" of the approximating curve. That is, it calculates the number of times the curve has to be recursively sub-divided in two, before the worst error between such a subdivision and the vector between its endpoints would be less than one half ORU. This value is used by the character shape player when it reads the character shape from the portable font resource so it knows how finely it has to subdivide each curve to accurately render it with vector approximations.

FIG. 17 shows the steps of the main program which performs this depth analysis, and FIG. 18 shows the steps of the recursive subroutine which actually performs the recursive subdivision. The main program has four major steps 430, 432, 434, and 436.

Step 430 checks if the distance between the vector spanning the curve's endpoints and each of the curve's control points is less than one half ORU. If so, it returns with a depth of 0, since the curve does not need to be subdivided at all to be approximated within the limits of the rounding error by a vector between its endpoints. The distance between the vector and the curve's control points is used because, by the nature of cubic Bezier curves, such a vector can never have a greater distance to any point on its associated cubic Bezier curve than its greatest distance to one of that curve's control points, and because it is mathematically much simpler to find the maximum distance from the vector to the two control points than it is to find the maximum distance from the vector to the curve.

If the test of step 430 is not met, step 432 calls the RecursiveSubdivision subroutine of FIG. 18. As shown in FIG. 18, this subroutine is called with pointers to the 1stEnd, 1stControlPoint, 2ndControlPoint, and 2ndEnd of the cubic Bezier curve it is to subdivide. It is also called with the depth of is recursion. The subroutine comprises steps 440, 442, 444, 446, and 448.

Step 440 tests to see if the value of depth with which the subroutine is called is greater than the current value of maxDepth, the maximum depth reached so far by any recursion performed on the entire curve. If so it sets the value of maxDepth equal to the recursion's depth. Then step 442 finds the midpoint of the Bezier curve with which the recursion has been called and divides that curve into two new two Bezier curves at that midpoint. Then step 444 finds which of the new sub-curves has the greatest distance from a vector between its endpoints and one of its two control points. Once this has been done, step 446 tests to see if this greatest distance is less than one half ORU. If so, step 446 stores 1stEnd and 2ndEnd in a structure called deepestSubCurve, so the routine shown in FIG. 17 will be able to tell where the curve with the deepest recursion ended, and it returns to that routine. If not, step 448 calls the RecursiveSubdivision subroutine for the newly formed sub-curve with the greatest distance between a vector spanning its endpoints and one of its two control points.

As those skilled in computer programming will appreciate, this RecursiveSubroutine will keep dividing a given Bezier curve in half, picking the worst fitted half, and then dividing that half in half, until the worst fitted half is fitted to within one half ORU. At that point maxDepth will hold the level of the deepest recursion and deepestSubCurve will hold the endpoints of the deepest sub-curve. Then the deepest recursion will return to the recursion that called it, and that recursion will return to the recursion that called it, and so on, until the initial calls to RecursiveSubroutine returns to step 432 of FIG. 17.

At this point step 434 tests to see if one of the endpoints of the deepest sub-curve stored in deepestSubCurve is one of the end points of the entire curve for which the depth calculation is being made. If so, it calls the RecursiveSubdivision subroutine again, this time for the half of the entire curve which contains the opposite end of the entire curve from that containing the deepest sub-curve found by the prior recursion. This is done because the deviation between the subdivisions of a given cubic Bezier curve and vector approximations to those subdivision will either have one local maximum, which is the global maximum for the entire curve, somewhere between the curve's two endpoints, or two local maximum located at each of the curve's two endpoints, one of which might require deeper recursion than the other. In the first case, the recursion of the first call to the RecursiveSubroutine in step 432 are guaranteed to catch the maximum deviation for the entire curve. But in the second case, the half of the entire curve which has the greatest deviation at the first level of recursion might not be the one having the end with the deepest local maximum, and, thus, the recursions of step 432 might not find the curves true maximum depth. Step 434 causes the recursion to be performed for the other half of the entire curve in this second case to ensure that the depth of both ends of the entire curve will be found, so that maxDepth will contain that deepest depth.

The depth finding algorithm shown in FIGS. 17 and 18 significantly speeds the operation of the character shape recording because it only pursues recursion on the half of each sub-curve which is worst fitted by a vector, thus preventing the amount of computation required for the depth analysis from going up exponentially with the depth of the curve.

Returning now to FIG. 9, after step 422 has been completed, step 424 inserts the approximated segment calculated by step 420 into the point array 339A of the open contour struct 349A shown in FIG. 10. It can be seen that the segmentation of the outline segments represented by points on curve and control points in the contour's point array are dependent on the horizontal and vertical tangents, inflection points, filtered corners, and boundaries between curves and significant lines found in the shape defined by the outline segments received from ExecChar() calls to the CSR, rather than by the actual segmentation of those received outline segments.

Once newly approximated outline segments have been placed into the open contour 349A, step 426 deletes from the character shape array all points which are not part of a segment which has not yet been approximated or which are not needed to process such an unapproximated segement. It does this to conserve memory, since such points have no further use.

Either step 346 or 358 and its respective sub-steps are repeated for each of ExecChar()'s calls to the CSR during the processing of a given character-font shape.

Each subsequent time a call to CsrMoveTo() is received from ExecChar(), it indicates the end of the description of one contour, or outline, in the shape being described by ExecChar() and either the beginning of another such contour or, if there are no more such contours, the move to the starting position for the next character which marks the completion of that shape's description by ExecChar(). In either case, when such a subsequent call to CsrMoveTo() is received, step 352 completes and closes the open contour 349A and step 354 places in its proper place into the contour tree.

Step 354 places it into the hierarchical contour tree 356 as follows:

If the contour tree is empty, it points a global variable pContourRoot to the new contour. If the contour tree is not empty, scan the list of contours at the top level. For each scanned contour, if the new one encloses it, remove the scanned contour from the list and add it to the new contour's daughter list, pointed to by pDaugther 452. If the new contour is enclosed by the scanned contour, restart the scanning process with the scanned contour's daughters. When the end of the list being scanned is reached, add the new contour to the list. The actual contour insertion process maintains a consistent order for sibling lists to ensure that the glyph matching, described below, is reliable. The order is based on the value of xmin in the contour's bounding box, ContourBBox. In the event of a tie, the order ymin, xmax, or ymax is used until a difference is found. There should be no case of distinct sibling contours that have identical bounding boxes.

In the example shown in FIG. 10, the contour 349B associated with the outside outline of the circle in the registered trademark symbol 453, will ultimately be placed at the first, or highest, level of the contour tree because it enclose all that symbol's other contours. The contour 349C, associated with inside outline of that circle, will be a 2nd level contour. The contour 349D, associated with the outside outline of the "R" in the registered trademark symbol, will be a 3rd level contour. And the contour 349E, associated with the inside outline of the "R" will be a fourth level contour. It should be understood that some characters will have multiple contours at one level. For example, the shape "½" will have three contours all at the first level, whereas the shape "B" will have one contour at the first level and two depending from it at that second.

Once ExecChar() returns to CsrDoChar() at step 460 shown in FIG. 9, each outline of the character-font shape should be recorded in a closed contour structure 349, and each of those structures should be organized into a hierarchy indicating which encloses which. At this point an open contour exists which was created by step 350 by the last CsrMoveTo() called by ExecChar(), that associated with the character-font shape's escapement. Step 460 saves the location of the initial point in this open contour to calculate the escapement value for the shape being recorded and closes the open contour.

Then step 462 splits the contour tree 356 into two level sub-trees. That is, it groups each odd level contour and its zero or more daughter contours into a sub-tree 355. For example, in FIG. 10, the first level contour 349B, which represents the outside outline of the circle of the "®" symbol, and the contour 349C, which represent inside contour of that circle will be grouped into one sub-tree, and the contour 349D and 349E which represent the outer and inner outlines of that symbols "R" are grouped into another subtree. It turns out that each of these two level subtrees corresponds to a glyph element, that is, to an unconnected solid shape.

Once the contour tree has been separated into sub-trees corresponding to glyph elements, step 464 performs steps 466, 468, 470, 472, 474, 476, and 478 for each such glyph element.

Step for 466 standardizes the direction of the contour. That is, it checks to see if the sequence of outline segments in the top level, or outer, contour in each glyph element has a counter-clockwise direction, and if not it reverses the order of those segments to have such a counterclockwise direction. Similarly, it check to see if the segments of the second level, or inner, contours of the glyph have a clockwise direction, and if not it orders them to have that direction. This has the advantage of having the inner and outer contours of all glyph elements have the same direction, respectively, regardless of the direction in which those contours were delivered to the CSR.

Step 468 picks a standard start point for each contour. Because each contour is closed, the start point is arbitrary. However, in order to facilitate glyph matching and to optimize playback performance, the start point for each contour is picked based on a few simple rules. For outer contours, the start point is chosen to be the lowest point in the contour. If there are several equally lowest points, the rightmost one is chosen. For inner contours, the start point is chosen to be the highest point in the contour. If there are several equally highest points, the fightmost one is chosen. The indexes of both possible start points is already set in the contour data structure during character shape processing. Picking the appropriate point is therefore simply a case of picking one of two indexes based on the desired direction of the contour.

Step 470 builds edge and stroke lists. Edge lists are lists of all horizontal and vertical edges of any significance, including horizontal and vertical tangents, in the shape. Strokes are pairs of such edges which represent the opposing sides of a given horizontal or vertical feature in the shape. These values are used in hinting.

Step 472 generates a glyph record 482 and glyph program string ("GPS") 484, as shown in FIG. 10, for the glyph element. The glyph program string represents the sequence of outline segments in each of the glyph element's associated contours after those sequences have been standardized in steps 466 and 468 in the order in of those contours in the glyph element's associated sub-tree 355. It can be seen that the shape description is independent of any aspects of sequence of outline segments received from ExecChar() for the glyph's shape which are not mandated by that shape itself. This GPS is added to the end of a sequence of GPSs in the GPS memory. Its location and size in this memory is indicated by glyphProgramStringOffset 454 and glyph-ProgStringSize 452, respectively, in the Glyph record. The glyph record also calculates a glyph signature 456. The signature is a compact byte string that has a high probability of uniquely identifying a glyph. This identification is independent of position and scale factor. It includes the glyph's number of contours, the number horizontal and vertical edges calculated in step 470, the relative size of the right most stroke calculated, the relative position of the left edge of rightmost stroke, the relative size of the topmost stoke, the relative position of lower edge of topmost stroke, the number of outside corners in outside contour, the number of inside corners in outside contour, the number of outside corners in inside contours, and the number of inside corners in inside contours. In this signature the positions and sizes are all relative to the glyph's bounding box, so that glyphs of the same shape, but different size, will have the same signature.

Once a new glyph record 482 and its associated new GPS 484A have been created, step 474 searches a binary tree 481, shown in FIG. 19, of all the glyph records 482 made for previously recorded glyph shapes. It searches this tree for a glyph record having the same signature. This tree is organized into a binary tree by the numerical value comprised of the collective bytes in each glyph record's signature. This is done to facilitate rapid searching for matching glyph shapes. In each glyph record in the tree, the pointer pNextDown 482 points to the descending branch of the tree whose glyph records have signatures with a lower value. The pointer pNextUp 484 to the descending branch whose corresponding glyph values have higher signature values. And the pointer pNextEqual 486 points to the glyph records, if any, which have the same signature value. A group of glyph records 482C, having equal signature values is shown in FIG. 19.

If the search finds a glyph record 482B, as shown in FIG. 19, having the same signature as a new glyph record 482A, step 476 performs steps 488 and 490. Step 488 compares the sequence of points in the GPS 484B pointed to by the glyph record 482B having the same signature as the new glyph record 482A with the points in the new glyph record's associated GPS 484A. Before this match is done the bounding boxes of the two glyph shapes are normalized to the same size, so the match will be scale independent. This enables the shape of the "R" in "®" to match that in "R", and the shape of the "1" in "½" to match that in "1" In the example shown, is it assumed the points in the GPS 484B associated with glyph record 482B do not match those of the new glyph record's GPS 484A.

If there are a group of sibling glyph records in the glyph tree whose signature matches that of the new glyph record 482A, then the new glyph record's associated GPS 484A is compared against the GPS's of each of those sibling glyph records. In the example of FIG. 19, this means GPS 484A is also compared against the GPS 484D, associated with the glyph record 482D. In the example, it is assumed these two GPSs match.

The ability to make such a match rapidly is greatly facilitated by the fact that the order of contours, the direction of contours, and the start point of contours in each GPS are standardized, and independent of the particular manner in which the shape of that glyph was delivered to the CSP by ExecChar(). This means that glyphs with the same shape, whether received from different characters, different fonts, or even different font description languages will almost always have the exact same GPS, allowing for scaling and rounding errors, and thus can be rapidly matched.

If an exact match, allowing for rounding error, is found, as in the case of GPSs 484A and 484D in FIG. 19, step 490 normally deletes the new glyph record's GPS 484A, and points the glyphProgramStringOffset and glyphProgramStringSize values in the new glyph record 482A to the matching GPSs 484D. If the new glyph record's GPS has a different size than the previously recorded matching GPS, scaling information to convert the glyph described in the previously recorded matching GPS to the proper size is associated with the new glyph record. If the size described in the new GPS 484A is enough larger than that described in the previously recorded matching GPS 484D, they will be treated as not matching to prevent an undesirably low resolution description of the glyph's shape from being used for the new glyph record.

Once the test for matching glyph shapes has been completed, step 478 inserts the new glyph record 482A into the glyph record binary tree 481 at the appropriate location, if the glyph's GPS does not match any previously in the tree.

After the glyph record tree has been searched for all the glyphs of the character-font shape currently being processed to find if any of those shape can be defined by reference to a common GPS, step 480 points the glyphProgramStringOffset 490 and glyphProgramStringSize 492, shown in FIG. 8, of the character record 330 for the characterfont shape being processed to the character's GPS. If the character record's associated shape is formed by scaling, translating, or combining glyphs defined by one or more other GPSs, the GPS pointed to by the character record will be a compound GPS, such as the GPS 484D shown in FIG. 8. Each such compound GPS is contains one or more pointers to such other GPSs, along with any necessary scaling and translating information necessary to define the size and location of each such other GPS's associated glyph in the character record's associated shape.

Once this is done, step 496 updates the x or y maximum or minimum of the current physical font's bounding box if the x or y maximum or minimum of the bounding box of the character-font shape being processed is more extreme than any such x or y maximum or minimum of any character-font shape previously processed by the font.

At this point the processing of the character-font shape for which CsrDoChar() has currently been called is complete, and CsrDoChar() returns.

Returning now to FIG. 6, when the call to CsrDoChar() 153 in step 236 is complete, step 238 places a code 219A for the character in the text 118 of the portable document, and the program advances to the top of loop 214 to process the next code received from the input text.

If the code received from the input text is a position code 221, the test in step 220 is met, and that step places a corresponding positioning code 221A in the output text, and the program advances to the top of the loop 214.

The input text can include descriptions, or codes, 223 representing the shape of non-character shapes, such as the logo 242 shown on the video display 106 in FIG. 1. In the embodiment shown in FIG. 6 these descriptions are coded in the PostScript page description language, a language which not only describes fonts but also page layout, and non-character shapes.

When a non-character shape code 223 is received in the input text, the test in step 222 is met, and that step acts as if a font code has been received for a font "shape" and it assignes a unique character code for the non-character shape described by that code 223. Step 222 point pfontID to "shape", places standard values in FontAttributes, calls CsrSetFontSpecs(), places the returned FontCode for the "shape" font in the text of the portable document 104. Then step 222 calls CsrDoChar() for the shape's unique charCode to build a font description of its shape, and places the shape's unique charCode 219A in the portable document's text.

During the operation of step 222 when pFontID points to "shape", GetFontInfo() supplies CsrSetFontSpecs with the outline resolution in which the shape will be described to the CSR, GetCharID() returns nulls, indicating that the characters used for hinting are not available in the "shape" font, causing CsrSetFontSpecs() not to call ExecChar, and when CsrDoChar() calls ExecChar(), it returns moves, lines, and curves defined by the PostScript shape description.

Once the loop 214 has processed all of the codes in the input text 116, step 244 calls the CSR's CsrWriteResource function 157. CsrWriteResource() calls WriteResourceData() to actually write this data because such a write depends on the operating system being used. CsrWriteResource() causes the data contained in the physical font records, and their associated logical font and character records, and in the glyph program strings to be compressed and recorded into the portable font resource ("PFR") 126, the major elements of which are shown in FIG. 20. As can be seen from this figure, the PFR includes a logical font directory 500, one or more logical font records 502, one or more physical font records 504, one or more simple glyph program strings, and zero or more compound glyph programs strings 508, that is GPS's such as the GPS 484D shown in FIG. 8 which is defined by reference to one or more other GPSs. The logical font directory 500, includes a look-up table which translates the fontCodes 217A placed in the portable document to be converted into the address and size of that fontCode's corresponding logical font record 502 in the PFR. Each logical font record includes, among other things the FontAttribute values of the logical font and the address and size of its associated physical font record 504 in the PFR. Each such physical font record includes one or more character records 510, each of which includes the address and size of the simple or compound glyph programming string 506 or 508 which actually describes its shape as a sequence of moves, lines, and curves.

Once the call to CsrWriteResource has written the PFR, step 246 calls CsrClose to close the CSR, and the execution of the routine 204 is complete.

The drawing of the input text 116 shown in FIG. 6 is a schematic representation of the initial portion of the fonted text shown on the video monitor 106 in FIG. 1. The drawing of the portable document 104 shown in FIG. 6 is a schematic representation of text 118 representing that same fonted text. As can be seen by comparing these two texts, each font name 217, each character code 219, and each position code 221 in the input text has a corresponding fontCode 217A, charCode 219A, or position code 221A in the portable document, respectively. Furthermore, each non-character shape 223 coded into the input text has a fontCode 217A and a charCode 219A in the portable document.

FIG. 21 provides a somewhat more detailed schematic view of the functional elements shown in the second computer 108 in FIG. 1. It shows how the page builder 134 and the modular character shape player 136 interact to render a visual image of the fonted text contained in the portable document 104. It shows an embodiment, in which the second computer includes a font interpreter 120A and font resources 122A, similar in function the font interpreter 120 and font resources 122 described above with regard the first computer.

The page builder includes a main program 250 and the callback functions 190–202 shown in FIG. 5, several of those call back functions which are not necessary are not shown in FIG. 21.

The first step shown for the page builder's main program is step 252. The calls the character shape player's, or CSP's, CspOpen() function 171. This opens and initializes the CSP data structures.

Once the call to CspOpen() returns, step 254 determines the relationship of the image to be created to the portable document, including the location of the image relative to the document and it size, scale, and rotation relative to the document. It uses these to calculate the outputMatrix and outputBBox for the image. The outputMatrix describes how document coordinates calculated from the portable document are offset, scaled, or slanted relative to the coordinates of the image to be created. The outputBBox defines what locations in document coordinates will not fit into that image, and thus do not need to be generated by the CSP.

Step 256 tests to see if bitmapped or outline output is desired. Bitmapped output is uses for most video displays and laser printers. It represent character shapes with an image comprised of an array of pixels. Outline output is used with plotters and it can be used to generate fonts. It represents images as a sequence of moves, lines, or curves.

If step 256 determines that bitmapped output is desired, steps 258 and 260 are performed. Step 258 calls the CSP's CspInitBitmapCache() function 170. This initializes the bitmap cache which stores a copy of the as many of the character-font shape which have been generated by calls to CspDoChar() as possible, so that when repeated calls are made to CspDoChar() for a given character-font combination, the actual bitmap of that shape will normally only have to be generated for the first of those calls, and upon subsequent calls the bitmap can merely be retrieved from the bitmap cache. After the call to CspInitBitmapCache() returns, step 260 calls the CSP's CspSetOutputSpecs() function 175 to set the CSP to render bitmapped images. If step 256 determines that outline output is to be used, step 262 calls CspSetOutputSpecs() to set the CSP to generate outlines.

In either case the call the CspSetOutputSpecs() also sets the CSP's outputMatrix and outputBBox data structures to reflect those of the page builder. The CSP's outputMatrix determines how the coordinates of the shapes produced by the CSP should be scaled and rotated relative to those contained in the new font descriptions for those shapes. The CSP's outputBBox will cause the CSP to not render shape information which is clearly outside the image being generated.

Once the call to CspSetOutputSpecs() in either step 260 or 262 returns, step 264 performs a loop which sequences though the codes in the text 118 in the portable document, until all of those codes which correspond to information in the image being generated have been processed. This loop is comprised of steps 266, 268, and 270.

If the current code being processed from the text 118 is a fontCode 217A, step 266 causes steps 274, 276 and 278 to be performed.

Step 274 calls the CSP's CspGetFontSpecs() function 173 to get the font name of the font represented by the current fontCode. Once this has been done step 276 checks to see if the second computer's font interpreter 120A and font resources 122A can render images of characters in that font. This requires both that the font interpreter 102A be able to interpret the font description language used for that named font and that a set of pre-defined font descriptions for that named font reside in the font resources 122A. If this test is met, and the font can be rendered by the font interpreter, step 276 sets the OrigFont flag to indicate that the named font's pre-defined, or original, fonts can be used. If the font interpreter cannot render the named font, step 278 clears the OrigFont flag and calls the CSP's CspSetFont() function 176 for the fontCode. This sets the fontCode as the CSP's currently active logical font, and, thus, its associated physical font as the CSP's currently active physical font.

If the current code being processed from the text 118 is a position code 221 A, step 268 calculates a new current document position to indicate where the next shape rendered should be placed relative to the current document being imaged.

If the current code being processed from the text 118 is a charCode 219A, step 270 causes substeps 280 and 282 to be performed. Substep 280 tests to see if the OrigFont flag is set, and if so, it calls the computer's font interpreter to get the shape of the current charCode, and it outputs that text at the current device, or image, coordinate, and then it updates the current document and image coordinate to reflect the escapement (normally width) associated with that character's image. If the OrigFont flag is not set, however, the test of substep 282 is met and that step calls the CSP's CspDoChar() function 178 for the character code and current device coordinates. CspDoChar() generates a bitmapped image or outline description of the character at the current device position and updates the page builder's current device position by the escapement of that character. If bitmap output is set, it generates this image by calling the page builder's SetBitmap() callback function 193. CspDoChar() calls this function with pointers to the bitmapped pattern of the character, the size of that pattern, and the current device coordinates. SetBitmap() gets that pattern and actually inserts it in the image buffer. If outline output is set, CspDoChar() calls the page builder's outline-output callback functions. These includes the Vstem() and Hstem() functions 197 and 198, which receive hinting information about the standard vertical and horizontal stroke width of the current font. They also include the Moveto(), LineTo(), CurveTo(), and ClosePath() functions 199–202 which receive instructions for move, lines, curves, and commands to draw a line to the first point in an outline from CspDoChar() and which actually use those instruction to draw shapes in the image buffer.

Once the loop 264 has processed all the codes in the text 118 which are associated with the image to be created, it will have created that image. At this point it can exit the page builder program or subroutine by calling the CSP's CspClose() function 178, as shown in step 284. This will close all the player's data and memory structures. However, in embodiments in which the page builder is being used to interactively view a document, the program could loop back up to step 254, wait for a new command which changes the location, size, scale, or rotation of the image to be shown, and create a new image as soon as input is received from the user indicating a change in any of those parameters.

It should be understood that the foregoing description and drawings are given merely to explain and illustrate and that the invention is not limited thereto except insofar as the interpretation of the appended claims are so limited. Those skilled in the art who have the disclosure before them will be able to make modifications and variations therein without departing from the scope of the invention.

For example, it should be understood that in some embodiments of the invention which create portable documents, the document building program has the ability to insert new font descriptions into the portable font resource for all the characters in any font which has any one or more characters placed in the portable document. It can do this by calling CsrDoChar() for each character in the character set whenever a call to CsrSetFontSpecs() calls GetFontInfo() and GetFontId(), indicating that the font with which CsrSetFontSpecs is being called is a new physical font. This enables one receiving the portable document to edit the document in all fonts contained in it.

It should also be understood that the invention has uses in many different types of applications.

For example, the invention is very useful with printer controllers and printer drivers, to ensure that a fonted document can be properly printed by a given printer. Where a printer's controller or the computer directly driving it has a page builder and character shape player of the general type described above, the printer is capable of printing any set of fonts sent to it as part of one of the invention's portable documents. Where all the printers on a network have this capability, one could send a portable document to any such printer and be assured that it would be printed correctly with all the desired font shapes.

The invention is of great use with presentation software. Presentation software which includes a page builder and character shape player, can faithfully reproduce the fonts in any presentation which is created as a portable document with an embedded portable font resource. This lets any such presentation be used on any computer having such presentation software, without concern for which fonts are, or are not, present in the computer's associated font resource.

The invention is also of great use in networked applications such as email, groupware, computer bulletin boards, on-line services, and the so-called information superhighway. By using systems, such as are shown in FIG. 3, it allows media containing fonted text and portable font resources to be sent over the network and accurately rendered by any receiving computers containing a page builder and character shape player without concern for what fonts that computer has in its font resources. This is particularly important in applications where fonted text is being received from, and then viewed by, thousands, or millions, of different computers, each with different possible combinations of font resources.

In interactive networked applications, the portable document can be generated interactively. That is, as each successive line or screen is transmitted any new font descriptions required for its characters could be sent with it.

The invention is of great used in electronic publishing, such as the publishing of CD-ROMs, because it assures that any desired fonts used in electronically published documents can be accurately portrayed on virtually any computer without having to worry whether or not its font resources contain each font contained in the published information.

In networked, electronic publishing, and other applications, the actual code for the page builder and character shape player can be sent with the portable document to ensure that each computer receiving the transmission will be able to play it.

The invention is useful in applications for creating and editing font sets. For example, in some embodiments the character shape player is used as part of applications to convert pre-defined font descriptions into new font descriptions which are derived only from the shape information in the pre-defined font descriptions. These new font descriptions can then be installed into a computers font resources. In such applications, software similar to the character shape player is designed to be installed as one of the computer's font interpreters.

The invention is also of great use in multimedia applications. It allows fonted text in such multimedia to be compactly represented by alphanumeric symbols, and to be quickly and accurately reproduced by any computer. In such applications, and in draw and desktop publishing applications, the invention can be modified to handle color, 3-d, transparency, and other graphic effects.

As those skilled in the computer arts will understand, many of the functions described above as being performed in software could be performed in hardware. Similarly, the particular division of functionality into specific functions and modules described above is highly arbitrary and the invention is not limited to such divisions. For example, in some embodiments of the invention the document builder and character shape player can be constructed as a single software module, instead of two. In others, the document builder will not be a separate software module, but rather will be pan of a larger host application, such as a word processor, desk top publisher, or presentation program. In others, the character shape recorder and player can be pan of one larger module, designed for use in application which both create, view, and edit portable documents.

It should be understood that in other embodiments of the invention's character shape recorder the rules used for extracting new font descriptions from the shape defined in pre-defined font descriptions could be different. For example, in some a given portion of an outline segment in the character shape array between points which have been marked as description-independent points, such as corners, tangents, inflections, or X or Y extreme values could be approximated with multiple curves, instead of a single curve, if the fit reached by only a single curve was less accurate than desired. On others, for example, different standard starting points or contour directions could be used for new font descriptions, or different types of descriptions could be used for representing curved outline segments.

The embodiment of the invention described in detail above is capable of receiving pre-defined font descriptions written in PostScript, TrueType, and Speedo languages. It should be understood that in other embodiments of the invention, the document builder or character shape recorder could be designed to receive pre-defined font descriptions written in other font description languages, such as Intellifont, or new font description languages which might be developed in the future.

For example, the Intellifont language describes curves as circular arcs. This could be accommodated by having the document builder's ExecChar() function convert each circular arc outline segment it receives from an Intellifont font interpreter into a corresponding Bezier curve. It could be accommodated by modifying the character shape recorder itself to have a CsrArcTo() function to receive such an arc and to convert it into a Bezier curve. If, in the future, other font description languages which define outline segments in other ways are developed, the character shape recorder or its associated host software can be changed to accommodate such new descriptive techniques.

In the embodiment of the page builder described above, the page builder tests to see if its computer's font interpreter and font resources can render a given font, and if so, it causes the font to be rendered by the font interpreter. In other embodiments, the page builder renders all characters in the portable document using the character shape player.

In the embodiments of the invention described above, fonted texts have been converted into a single portable document comprised of corresponding output text and a portable font resource. In some embodiments, however, the output text and the portable font resource could be placed in separate files, or perhaps be stored in separate memory locations.

As these examples show, the invention has many possible embodiments, and its scope is not limited to the detailed description provided above, but rather is best defined by the claims that follow.

(The appendix which follows the claims, entitled Bitstream Portable Font Technology, Theory of Operation is attached as part of this specification to explain the operation of a preferred embodiments of the character shape recorder and character shape player shown in FIGS. 4, 5, 6, and 21 in greater detail.)

What we claim is:

1. A computer system comprising:

means for receiving an input text representing a sequence of characters, each of which has an associated shape defined by an associated pre-defined font;

means for receiving a pre-defined font description which defines the shape for each unique combination of a character and associated pre-deformed font in the input text;

modeling means for creating a geometric model of the character-font shape defined by each received pre-defined font description, which model models the one or more outlines of the character-font shape and explicitly indicates features in the character-font shape which are not explicitly indicated in the model's associated pre-defined font description;

means for generating a new font description from the model created for each received pre-defined font description, which new font description describes the shape represented by said model as a sequence of outline segments, said means for generating including means for using said explicitly indicated features to determine where to divide the modeled outlines of the character-font shape into outline segments of the new font description;

means for creating an output including:
a sequence of characters corresponding to those of the input text;
the new font descriptions created for the character-font shapes of the input text; and
an indication of which of the new font descriptions represents the shape of each character in the output text.

2. A computer system as in claim 1 wherein:

said modeling means includes means for marking points in each modeled character-font shape which represent extremes in the horizontal and vertical direction; and said means for generating a new font description includes means for starting new outline segments at said points marked as extremes.

3. A computer system as in claim 1 wherein:

said modeling means includes means for marking points in each modeled character-font shape which represent inflection points in the outline of that shape; and said means for generating a new font description includes means for starting new outline segments at said points marked as inflection points.

4. A computer system as in claim 1 wherein:

said character-font shape described by individual pre-defined descriptions are comprised of one or more separate shapes, or glyphs, each of which is described by one external outline and zero or more internal outlines;

said modeling means includes:
means for modeling the external and internal outlines described in received pre-defined descriptions;
means for determining which outlines defined by a given pre-defined description are associated with the same glyph, and which of the outlines associated with the same glyph are external or internal outlines;
means for marking a starting point on each modeled external and internal outline according to a standardized rule for external and internal outlines, respectively, which rules are used for all of said outlines and are independent of any aspect of a pre-defined description which is not inherent in the character-font shape the pre-defined description describes;

said means for generating a new font description from the model of a character-font shape includes means for generating such a new font description which describes the shape of each outline in that model and for starting the sequence of outline segments describing each such outline at a point corresponding to said starting point marked for that outline.

5. A computer system as in claim 1 wherein said pre-defined font descriptions describe character-font shapes as bitmap patterns.

6. A computer system as in claim 1 wherein said pre-defined descriptions describe character-font shapes as a sequence of outline segments.

7. A computer system as in claim 6 wherein the order and segmentation of the outline segments in the new font description has no dependence on the order and segmentation of the outline segments in the pre-defined font description which is not a function of the actual shape described by the pre-defined font description.

8. A computer system as in claim 6 wherein:

said means for receiving an input text includes means for receiving an input text which can include non-character shapes at a given location relative to said sequence of characters;

said means for receiving a pre-defined font description includes means for receiving a pre-defined font description of such a non-character shape as a sequence of outline segments;

said modeling means creates a geometric model for each such non-character shape;

said means for generating a new font description generates a new font description for each such non-character shape; and said means for creating an output include means for including in that output the new font description for each such non-character shape and for indicating the location of that shape relative to the output's sequence of characters.

9. A computer system comprising:

means for receiving, for each of a plurality of characters, each of which has an associated pre-defined font, an identification of the particular character it represents, and a pre-defined font description defining the character's shape in its associated font, which pre-defined font description includes a sequence of outline segments defining the one or more outlines of the character's shape;

modeling means for generating a geometric model from the received pre-defined font description for each such character-font shape, which model represents the shape of the one or more outlines defined by such pre-defined description, said modeling means including means for identifying description-independent segmentation points in the one or more outlines represented by each such model which are a function of each such outline's shape independently of the particular sequence or segmentation of the outline segments used to defined that shape in the pre-defined font description;

means for generating a new font description from each such geometric model which includes an indication of the particular character associated with that model and a sequence of outline segments of the one or more outlines represented by that model, in which the segmentation of each new font description is dependent on said description-independent segmentation points.

10. A computer system as in claim 9 wherein:

said modeling means includes means for approximating the shape of the outline, defined by the model generated for a given character-font shape, between adjacent description-independent points with new outline segments bounded at those adjacent description-independent points; and said means for generating new font descriptions includes means for generating such a new font description for a given character-font shape which describes the one or more outlines associated with that shape as a sequence of outline segments which includes said new outline segments.

11. A computer system as in claim 9 wherein:

said modeling means including means for ordering the outlines of the geometric model generated for each character-font shape according to a standard rules used for all such models; and said means for generating new font descriptions include means for ordering each new font description's sequences of outline segments according to the ordering of the corresponding outlines by said modeling means.

12. A computer system as in claim 9 wherein:

said means for identifying description-independent segmentation points includes identifying one of said points as a starting point for each outline of each model according to a standard set of rules applied to all such outlines which is a function of each such outline's shape independently of the particular sequence or segmentation of the outline segments used to define said shape in the corresponding pre-defined font description;

said modeling means further including means for assigning a direction in which the description-independent segmentation points of the outlines of each model are to be read, starting at said starting point selected for the outline, said direction being assigned according to a standard set of rules applied to all such outlines which is independent of the particular sequence of the outline segments used in the corresponding pre-defined font description;

said mean for generating a new font description generates the sequence of outline segments for each outline in a given model in the direction assigned for said outline starting at the starting point identified for said outline.

13. A computer system as in claim 9:

wherein said modeling means includes:

means for comparing outline shapes modeled from the pre-defined font descriptions for different character-font shapes to determine which of said character-font shapes share similar outline shapes; and means for storing an indication of which of said outlines shapes are determined to be shared by which character-font shapes; and wherein said means for generating new font descriptions further includes:

means for generating common font descriptions for such shared outline shapes, each of which common font descriptions defines it associated shared outline shape as a sequence of outline segments;

means for generating new font descriptions for character-font shapes which contain shared outline shapes, which new font descriptions define the sequence of outline segments for a given shared outline shape by reference to the common font description for said shared outline shape.

14. A computer system as in claim 9 wherein:

said means for receiving said character identifications and pre-defined font descriptions includes means for receiving an indication of the grouping of such pre-defined font descriptions into pre-defined fonts; and said means for generating new font descriptions includes means for grouping new font descriptions into new fonts, each of which corresponds to a given pre-defined font and has new font descriptions corresponding to pre-defined font descriptions associated with said given pre-defined font.

15. A computer system as in claim 14 wherein the means for generating new font descriptions further includes:

means for grouping the new fonts into families of new logical font, each having an associated new physical font, such that the shape for each character in each new logical font can be derived by a set of transformations associated with the new logical font from that character's shape in the associated new physical font;

means for generating a new physical font description for each of a plurality of characters in each new physical font, which new physical font description describes the character's shape with a sequence of outline segments for each of the one or more outlines which represent that shape; and means for generating a new logical font description for each logical font which describes the physical font with which the logical font is associated and the set of transformations for deriving the shape of a character in said logical font from said physical font.

16. A computer system as in claim 9 wherein:

said means for receiving said character identifications and pre-defined font descriptions includes means for receiving as one of said character identifications a symbol representing a non-character shape and means for receiving as one of said font descriptions a description including a sequence of outline segments which define the one or more outlines of that non-character shape;

said means for generating a geometric model generates a geometric model for each such non-character shape;

said means for generating a new font description generates a new font description for each such non-character shape.

17. A computer system as in claim 9 wherein said means for identifying description-independent segmentation points includes corner detecting means for detecting which of the endpoints of the outline segments described by a pre-defined font description represent corner points in the outlines of the shape defined by said pre-defined font description, said corner detecting means including:

means for testing, for each endpoint being tested and the two adjacent endpoints on its outline, to see if a straight line can be drawn through those three endpoints if the position of each is allowed to be adjusted by an amount corresponding to possible quantization error; and means for identifying the tested endpoint as a description-independent corner point if the test determines that such a line cannot be so drawn.

18. A computer system as in claim 17 wherein said means for testing includes means, operative when one of the outline segments ended by the endpoint being tested is a bezier curve, for treating the nearest control point on that curve as the adjacent endpoint for that curved segment for purposes of said testing.

19. A computer system as in claim 17 wherein said means for testing include means for performing said test by testing to see if the concave angle, if any, formed by the endpoint being tested and its two adjacent endpoints can be changed to an angle equal to or greater than one hundred and eighty degrees if the position of each of those three points is moved by an amount corresponding to the maximum quantization error in a direction which tends to maximize that angle.

20. A computerized method comprising the steps of:

receiving, for each of a plurality of characters, each of which has an associated pre-defined font, an identification of the particular character it represents, and a pre-defined font description defining the character's shape in its associated font, which description includes a sequence of outline segments defining the one or more outlines of the character's shape;

modeling the character-font shape defined by each received pre-defined font description, including
identifying description-independent segmentation points in the one or more outlines represented by the pre-defined font description, the location of which description-independent points is determined by each such outline's shape, independently of the sequence or segmentation of the outline segments included in the pre-defined font description:
approximating the shape of each outline defined by the pre-defined font description between adjacent description-independent points with new outline segments bounded at those adjacent description-independent points; and generating a new font description from the character-font shape modeled for each received pre-defined font description, which new font description describes the character-font shape as a sequence of outline segments which includes said new outline segments.

21. A computer system comprising:

means for receiving, for each of a plurality of characters, each of which has an associated pre-defined font, an identification of the particular character it represents, and a pre-defined font description defining the character's shape in its associated pre-defined font, which description includes a sequence of outline segments defining the one or more outlines of the character's shape;

modeling means for creating a model of the character-font shape defined by each of a plurality of said pre-defined font descriptions, which modeling means includes:
means for comparing the outlines of different character-font shape models to determine which outlines from different models share similar shapes;
means for storing an indication of which outlines are determined by the means for comparing to share similar shapes;

font generating means for generating a new font description from each such model which identifies the particular character associated with that model and describes a sequence of outline segments which define the shape of the one or more outlines represented by that model, said font generating means including:
means for generating common font descriptions for such shared shapes which defines each such shared shape as a sequence of outline segments; and
referencing means for causing new font descriptions for a model which contain a shared shape to describe the sequence of outline segments which defines that shared shape by reference to the common font description for that shared shape.

22. A computer system as in claim 21 wherein:

said means for receiving character identifications and pre-defined font descriptions can receive pre-defined font descriptions associated with different pre-defined fonts:

said means for comparing outlines can compare the outlines of models representing the shape of characters in different pre-defined fonts; and said means for generating common descriptions for shared shapes can generate such common descriptions for shapes shared between models represented the shape of character's of different pre-defined fonts.

23. A computer system as in claim 21 wherein:

said means for receiving character identifications and pre-defined font descriptions includes means for interpreting coded pre-defined font descriptions written in a plurality of different font description languages, each of which coded pre-defined font descriptions defines the shape of a character as a sequence of outline segments defining outlines of that character shape;

said means for comparing outlines can compare the outlines of character-font shapes interpreted from coded pre-defined fonts descriptions written in different font description languages; and said means for generating common descriptions for shared shapes can generate descriptions for shapes shared between models associated with character-font shapes interpreted from coded pre-defined fonts descriptions written in different font description languages.

24. A computer system as in claim 21 wherein said means for comparing outlines includes means for making such comparisons independently of the size and position of such outlines, so that outlines in different models which have similar shapes but different sizes or positions can be treated as having a similar shape by the system.

25. A computer system as in claim 21 wherein:

said modeling means further includes means for creating a signature for a combination of one or more of each model's outlines, which signature is independent of the received pre-defined font description of said combination's outlines and includes a succession of data words having a standard order, each representing an abstraction about the shapes of said combination's outlines; and said means for comparing outlines includes means for comparing said signatures associated with different combinations of outlines, and only comparing the actual shapes of different combinations of outlines if the signatures for such combinations match.

26. A computer system as in claim 25 wherein said means for comparing signatures includes:

means for sorting said combinations of outlines by their signatures: and means for using the sorting of said combinations of outlines by their signatures to speed said comparison of signatures.

27. A computer system as in claim 21 wherein:

said modeling means groups together into glyphs the one or more outlines of a character-font model which represent the boundaries of each of the model's one or more unattached solid shapes;

said means for comparing outlines compares the grouping of outlines associated with different glyphs, so that a match is found only if all the outlines grouped into one glyph match all the corresponding outlines grouped into another glyph;

said means for storing an indication of which outlines share similar shapes stores an indication of which glyphs in different character-shape models are determined to share similar groupings of outline shapes, and, thus, are similar glyphs;

said means for generating common font descriptions generates such common descriptions for similar glyphs which share the same groupings of outline shapes; and said referencing means cause new font descriptions for character-font shape models which contains similar glyphs to describe the sequence of outline segments which defines such similar glyphs by reference to the common font description for that glyph.

28. A computer system as in claim 27 wherein said modeling means includes means for ordering the one or more outlines of each glyph according to a uniform rule, so, if two glyphs are similar glyphs representing the same shape, their outlines will be in the same order and, thus, the comparison of the shapes of such outlines can be sped up.

29. A computing system comprising:

means for receiving, for each of a plurality of characters, each of which has an associated pre-defined font, an identification of the particular character it represents, and a pre-defined font description defining the one or more outlines of the character's shape in its associated font;

modeling means for generating a geometric model which represents the shape of each outline defined by the pre-defined font description received for each character and font as a sequence of one or more outline segments, which can be either curved or straight;

wherein said modeling means includes depth calculating means for calculating a depth factor for individual curved outline segments in the model, which depth factor represents the depth of recursive subdivisions necessary to divide each such curved outline segment into sub-curves which all deviate by less than a specified maximum distance from vectors between the respective endpoints of said sub-curves, said depth calculating means including:

means for calculating said depth factor by performing recursive subdivision on each of said individual curved outline segments, including means operative in each given recursion of the subdivision for:

dividing the portion of the curve upon which the given recursion is performed into multiple sub-curves;

measuring if the maximum deviation between each sub-curve created by the given recursion and a vector between the endpoints of said sub-curve is less than particular amount;

when the maximum deviations for all the sub-curves created by the given recursion are less than a particular amount, stopping the current branch of the recursive process;

when the maximum deviation for any sub-curves created by the given recursion is greater than the particular amount, selectively performing a deeper recursion upon the sub-curve created by the given recursion which has the greatest maximum deviation from the vector between its endpoints;

keeping count of the recursive depth of the given recursion;

means for basing the calculated depth factor for each of said curved outline segment on the greatest count of recursive depth produced by the means for keeping count during all the recursive subdivisions performed for that outline segment; and font generating means for generating a new font descriptions from each such geometric model which identifies the particular character associated with that geometric model and describes the model's sequence of outline segments which define the shape of the one or more outlines represented by that model, and which describes said depth calculated for each of the model's curved outline segments.

* * * * *